US012223258B2

(12) United States Patent
Moyers

(10) Patent No.: US 12,223,258 B2
(45) Date of Patent: *Feb. 11, 2025

(54) RULES/MODEL-BASED DATA PROCESSING SYSTEM FOR INTELLIGENT EVENT PREDICTION IN AN ELECTRONIC DATA INTERCHANGE SYSTEM

(71) Applicant: Open Text GXS ULC, Halifax (CA)

(72) Inventor: Roger David Moyers, Spring Hill, TN (US)

(73) Assignee: Open Text GXS ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,409

(22) Filed: May 1, 2023

(65) Prior Publication Data

US 2023/0267269 A1    Aug. 24, 2023

Related U.S. Application Data

(63) Continuation of application No. 17/548,407, filed on Dec. 10, 2021, now Pat. No. 11,699,025, which is a continuation of application No. 17/171,546, filed on Feb. 9, 2021, now Pat. No. 11,200,370, which is a continuation of application No. 16/789,089, filed on Feb. 12, 2020, now Pat. No. 10,922,477, which is a continuation of application No. 15/895,693, filed on Feb. 13, 2018, now Pat. No. 10,585,979.

(51) Int. Cl.
*G06F 40/16*     (2020.01)
*G06F 16/35*     (2019.01)
*G06F 40/123*    (2020.01)
*G06F 40/137*    (2020.01)
*G06N 20/00*     (2019.01)

(52) U.S. Cl.
CPC .............. *G06F 40/16* (2020.01); *G06F 16/35* (2019.01); *G06F 40/123* (2020.01); *G06F 40/137* (2020.01); *G06N 20/00* (2019.01)

(58) Field of Classification Search
CPC ........ G06F 40/16; G06F 16/35; G06F 40/123; G06F 40/137; G06N 20/00
USPC ...................................................... 715/249
See application file for complete search history.

(56) References Cited

U.S. PATENT DOCUMENTS 5,960,408 A * 9/1999 Martin ............... G06Q 10/0875
705/28

* cited by examiner

*Primary Examiner* — Kieu D Vu
*Assistant Examiner* — Broderick C Anderson
(74) *Attorney, Agent, or Firm* — Sprinkle IP Law Group

(57) ABSTRACT

A system for electronic data interchange (EDI) management includes a memory for storing the EDI document data and a machine learning model representing a set of features of EDI documents and a corresponding status. The system further includes a processor and a non-transitory computer readable medium storing instructions for: accessing an EDI file, the EDI file comprising envelope metadata for an envelope and a first EDI document: and translating the EDI file into a first translated EDI document containing the envelope metadata and a set of EDI document data extracted from the first EDI document, the first translated EDI document formatted according to a hierarchical structure comprising attributes translatable into features processable by the machine learning model to determine a status of the first EDI document.

23 Claims, 19 Drawing Sheets

ISA*00* *00* *ZZ*SENDER *ZZ*RECEIVER *160328*1558*^*00403*000000018*0*P*|~GS*PO*SENDER*RECEIVER*20160328*15580900*465*X*004030~ST*850*004650001~BEG*01*AC*po number*release number*20151212*contract number~CUR*004*USD*9.134*002*CAN*IMF*002*20151212*10101010~DTM*005*20151212*10101010*03*CD*date time period~LIN*1*A2*product~PID*S*02*11*description*description~N1*ST*Name*11*Name ID~N2*Additional Name Line 1*Additional Name Line 2~IN2*02*Name line 1*Name line 2~N3*Address line 1*Address line 2~N4*City Name*ST*31245*USA*11*Location ID~PO1*1*1*02*1.23*AB*A1*product service id~PID*F*02*11*DESC*description*2S*Source*U*ENG~N1*002*Name*10*Identification Code*02*002~N2*Additional Name Line 1*Additional Name Line 2~N4*City*TX*337799*USA*11*Location ID~AMT*02*123456*D~SE*18*004650001~GE*1*465~IEA*1*000000018

```
ISA*00*   *00*   *ZZ*SENDER   *ZZ*RECEIVER   *160328*1558*^*00403*000000018*0*P*|
GS*PO*SENDER*RECEIVER*20160328*15580900*465*X*004030                          404
ST*850*004650001
BEG*01*AC*po number*release number*20151212*contract number
CUR*004*USD*9.134*002*CAN*IMF*002*20151212*10101010                            406
DTM*005*20151212*10101010*03*CD*date time period
LIN*1*A2*product                                              418
PID*S*02*11*description*description
N1*ST*Name*11*Name ID
N2*Additional Name Line 1*Additional Name Line 2
IN2*02*Name line 1*Name line 2
N3*Address line 1*Address line 2
N4*City Name*ST*31245*USA*11*Location ID
PO1*1*1*02*1.23*AB*A1*product service id ── 410        428
PID*F*02*11*DESC*description*2S*Source*U*ENG
N1*002*Name*10*Identification Code*02*002
N2*Additional Name Line 1*Additional Name Line 2
N4*City*TX*337799*USA*11*Location ID
AMT*02*123456*D
SE*18*004650001                                          408
GE*1*465
IEA*1*000000018
```

FIG. 4B

```
{
    "PartnerState": "TN",
    "bu_name": "ACME, Inc.",
    "PartnerCity": "NASHVILLE",
    "PartnerCurrency": "USD",
    "billing_trans_code": "1",
    "PartnerBuid": "BU83647489404",      ⟵ 510
    "Direction": "in",
    "SourceEntrySize": 859,
    "PartnerPhysicalAddress": "",
    "MEKstandardsId": "X12",
    "Mailbox": "ABJ00000",
    "HasMEKErrors": "no",
    "ISA":
    {
        "ISA09_1": "160328",
        "ISA08_1": "RECEIVER",
        "ISA07_1": "ZZ",
        "ISA02_1": "",
        "ISA14_1": "0",
        "ISA01_1": "00",
        "ISA15_1": "P",
        "ISA16_1": "|",
        "ISA06_1": "SENDER",
        "ISA10_1": "1558",
        "ISA05_1": "ZZ",
        "ISA11_1": "^",
        "ISA04_1": "",
        "ISA12_1": "00403",
        "ISA03_1": "00",
        "ISA13_1": "000000018"
    },
    "PartnerPostalCode": "",
    "PartnerCountry": "",
512⟶ "UUID": "87138703-a329-42c0-8066-16055be3ab6c",
    "bu_id": "",
    "GE":
    {
        "GE02_1": "465",
        "GE01_1": "1"
    },
514⟶ "MEKreleaseNumberId": "",
    "ST":
    {
        "LIN":
        [
            {
```

FIG. 5A

```
                    "LIN02_1": "A2",
                    "LIN01_1": "1",
                    "LIN03_1": "product"
            }
    ],
    "CUR":
    [
            {
                    "CUR05_1": "CAN",
                    "CUR04_1": "002",
                    "CUR03_1": "9.134",
                    "CUR02_1": "USD",
                    "CUR01_1": "004",
                    "CUR09_1": "10101010",
                    "CUR08_1": "20151212",
                    "CUR07_1": "002",
                    "CUR06_1": "IMF"
            }
    ],
    "SE":
    {
            "SE01_1": "18",
            "SE02_1": "004650001"
    },
    "N1":
    [
            {
                    "N102_1": "Name",
                    "N2":
                    [
                            {
                                    "N201_1": "Additional Name Line 1",
                                    "N202_1": "Additional Name Line 2"
                            }
                    ],
                    "N101_1": "ST",
                    "N3":
                    [
                            {
                                    "N302_1": "Address line 2",
                                    "N301_1": "Address line 1"
                            }
                    ],
                    "N4":
                    [
                            {
```

FIG. 5B

```
                                "N405_1": "11",
                                "N404_1": "USA",
                                "N406_1": "Location ID",
                                "N401_1": "City Name",
                                "N403_1": "31245",
                                "N402_1": "ST"
                        }
                ],
                "N104_1": "Name ID",
                "N103_1": "11",
                "IN2":
                [
                        {
                                "IN201_1": "02",
                                "IN202_1": "Name line 1",
                                "IN203_1": "Name line 2"
                        }
                ]
        }
],
"PO1":
[
        {
                "PO106_1": "A1",
                "PO107_1": "product service id",
                "PO104_1": "1.23",
                "PO105_1": "AB",
                "N1":
                [
                        {
                                "N102_1": "Name",
                                "N2":
                                [
                                                "N201_1": "Additional Name Line 1",
                                                "N202_1": "Additional Name Line 2"
                                ],
                                "N101_1": "002",
                                "N4":
                                {
                                        "N405_1": "11",
                                        "N404_1": "USA",
                                        "N406_1": "Location ID",
                                        "N401_1": "City",
                                        "N403_1": "337799",
                                        "N402_1": "TX"
                                },
```

FIG. 5C

```
                    "N106_1": "002",
                    "N105_1": "02",
        504         "N104_1": "Identification Code",
                    "N103_1": "10"
                },
            ],
            "AMT":
            [
                {
                    "AMT01_1": "02",
                    "AMT02_1": "123456",
                    "AMT03_1": "D"
                }
            ],
            "PID":
            [
502             {
                    "PID02_1": "02",
                    "PID01_1": "F",
                    "PID04_1": "DESC",
                    "PID03_1": "11",
                    "PID06_1": "2S",
                    "PID05_1": "description",
                    "PID08_1": "U",
                    "PID07_1": "Source",
                    "PID09_1": "ENG"
                }
            ],
            "PO102_1": "1",
            "PO103_1": "02",
            "PO101_1": "1"
        }
    ],
    "BEG":
    {
        "BEG02_1": "AC",
        "BEG03_1": "po number",
        "BEG04_1": "release number",
        "BEG05_1": "20151212",
        "BEG06_1": "contract number",
        "BEG01_1": "01"
    },
    "PID":
    [
        {
            "PID02_1": "02",
            "PID01_1": "S",
```

FIG. 5D

```
                    "PID04_1": "description",
                    "PID03_1": "11",
                    "PID05_1": "description"
                }
        ],
        "ST01_1": "850",
        "DTM":
        [
                {
                    "DTM03_1": "10101010",
                    "DTM04_1": "03",
                    "DTM01_1": "005",
                    "DTM02_1": "20151212",
                    "DTM05_1": "CD",
                    "DTM06_1": "date time period"
                }
        ],
        "ST02_1": "004650001"
    },
    "IEA":
    {
        "IEA02_1": "000000018",
        "IEA01_1": "1"
    },
    "MEKUnrecognizedRecCnt": 0,
    "GlobalPlatformId": "",
    "CustomerId": "ABJ00000",
    "GS":
    {
        "GS02_1": "SENDER",
        "GS03_1": "RECEIVER",
        "GS04_1": "20160328",
        "GS05_1": "15580900",
        "GS06_1": "465",
        "GS07_1": "X",
        "GS08_1": "004030",
        "GS01_1": "PO"
    },
    "PartnerName": "ZZ:SENDER",
    "version": "1.2",
    "SourceArchive": "./defaultdata/ABJ00000/ABJ00000.tgz.T000000.D010100",
    "MEKtransactionSetId": "850",
    "data_source": "msarchive",
    "MEKInvalidDataMsgCnt": 0,
    "SourceEntryName": "archive01/edi_in/default850.txt",
    "MEKversionId": "004030",
    "PartnerAddress": "ZZ:SENDER"
}
```

FIG. 5E

| NAME | TERMS |
|---|---|
| PO101_1 | 1 |
| PO102_1 | 1 |
| PO103_1 | 02 |
| PO104_1 | 1.23 |
| PO105_1 | AB |
| PO106_1 | A1 |
| PO107_1 | product service id |
| PID01_1 | F |
| PID02_1 | 02 |
| PID03_1 | 11 |
| PID04_1 | DESC |
| PID05_1 | description |
| PID06_1 | 2S |
| PID07_1 | Source |
| PID08_1 | U |
| PID09_1 | ENG |

```
"PO1":[{
  "PO101_1": "1",
  "PO102_1": "1",
  "PO103_1": "02",
  "PO104_1": "1.23",
  "PO105_1": "AB",
  "PO106_1": "A1",
  "PO107_1": "product service id",
  "PID":[{
    "PID01_1": "F",
    "PID02_1": "02",
    "PID03_1": "11",
    "PID04_1": "DESC",
    "PID05_1": "description",
    "PID06_1": "2S",
    "PID07_1": "Source",
    "PID08_1": "U",
    "PID09_1": "ENG"
  }
  ]
}
]
}
```

FIG. 7A

Feature Vectors (Individual Elements of Segments)

| PID01_1 | PID01_1FTR | | PID08_1 | PID08_1FTR |
|---|---|---|---|---|
| F | (200, [102], [1.0]) | | U | (200, [117], [1.0]) |

| PID02_1 | PID02_1FTR | | PID09_1 | PID09_1FTR |
|---|---|---|---|---|
| 02 | (200, [138], [1.0]) | | ENG | (200, [174], [1.0]) |

| PID03_1 | PID03_1FTR |
|---|---|
| 11 | (200, [168], [1.0]) |

| PID04_1 | PID04_1FTR |
|---|---|
| DESC | (200, [25], [1.0]) |

| PID05_1 | PID05_1FTR |
|---|---|
| description | (200, [148], [1.0]) |

| PID06_1 | PID06_1FTR |
|---|---|
| 2S | (200, [65], [1.0]) |

| PID07_1 | PID07_1FTR |
|---|---|
| Source | (200, [171], [1.0]) |

⟨ 710 ⟩

| PO101_1 | PO101_1FTR |
|---|---|
| 1 | (200, [49], [1.0]) |

| PO102_1 | PO102_1FTR |
|---|---|
| 1 | (200, [49], [1.0]) |

| PO103_1 | PO103_1FTR |
|---|---|
| 02 | (200, [138], [1.0]) |

| PO104_1 | PO104_1FTR |
|---|---|
| 1.23 | (200, [166], [1.0]) |

| PO105_1 | PO105_1FTR |
|---|---|
| AB | (200, [105], [1.0]) |

| PO106_1 | PO106_1FTR |
|---|---|
| A1 | (200, [56], [1.0]) |

| PO107_1 | PO107_1FTR |
|---|---|
| product service id | (200, [69, 135, 155], [1.0, 1.0, 1.0]) |

RULES/MODEL-BASED DATA PROCESSING SYSTEM FOR INTELLIGENT EVENT PREDICTION IN AN ELECTRONIC DATA INTERCHANGE SYSTEM

CROSS-REFERENCE TO RELATED APPLICATIONS

This application is a continuation of, and claims a benefit of priority under 35 U.S.C. 120 of the filing date of U.S. patent application Ser. No. 17/548,407, filed Dec. 10, 2021, entitled "RULES/MODEL-BASED DATA PROCESSING SYSTEM FOR INTELLIGENT EVENT PREDICTION IN AN ELECTRONIC DATA INTERCHANGE SYSTEM," issued as U.S. Pat. No. 11,699,025, which is a continuation of, and claims a benefit of priority under 35 U.S.C. 120 of the filing date of U.S. patent application Ser. No. 17/171,546, filed Feb. 9, 2021, entitled "RULES/MODEL-BASED DATA PROCESSING SYSTEM FOR INTELLIGENT EVENT PREDICTION IN AN ELECTRONIC DATA INTERCHANGE SYSTEM," issued as U.S. Pat. No. 11,200,370, which is a continuation of, and claims a benefit of priority under 35 U.S.C. 120 of the filing date of U.S. patent application Ser. No. 16/789,089, filed Feb. 12, 2020, entitled "RULES/MODEL-BASED DATA PROCESSING SYSTEM FOR INTELLIGENT EVENT PREDICTION IN AN ELECTRONIC DATA INTERCHANGE SYSTEM," issued as U.S. Pat. No. 10,922,477, which is a continuation of, and claims a benefit of priority under 35 U.S.C. 120 of the filing date of U.S. patent application Ser. No. 15/895,693, filed Feb. 13, 2018, entitled "RULES/ MODEL-BASED DATA PROCESSING SYSTEM FOR INTELLIGENT EVENT PREDICTION IN AN ELECTRONIC DATA INTERCHANGE SYSTEM," now U.S. Pat. No. 10,585,979, issued Mar. 10, 2020, the entire contents of which are hereby expressly incorporated by reference for all purposes.

TECHNICAL FIELD

This disclosure relates generally to data processing in a network computing environment. More particularly, this disclosure relates to systems and methods for rules/model-based intelligent prediction in an electronic data interchange system.

BACKGROUND OF THE RELATED ART

Many organizations realize tremendous efficiencies by exchanging business documents with their trading partners via an electronic communication method known as electronic data interchange (EDI). Common documents exchanged include, among others, purchase orders (PO), invoices, advance ship notices (ASN), bills of lading and payment status documents.

There are a number of EDI standards that specify the encoding format of EDI documents, including mandatory information, optional information and document structural information. Examples include, but are not limited to, ANSI ASC X12, UN/EDIFACT, TRADACOMS, GS1 EDI. EDI documents may be exchanged using a variety of technologies such as FTP, telnet, e-mail, HTTPS, AS1, AS2 and others.

In general, trading partners wishing to participate in direct (point-to-point) EDI exchanges with each other must agree on a specific EDI standard and version to use and transmission method so that the trading partners' computer systems can exchange EDI documents. For example, trading partners may limit data types that can occur in certain fields. Thus, the EDI documents exchanged between trading partners have an EDI-encoded format known to both trading partners and are exchanged using an agreed upon protocol. An organization with several trading partners may have to acquire multiple hardware and software systems to participate in direct EDI exchanges with the trading partners if the trading partners use different EDI standards or transmission methods.

To address some of the deficiencies of direct EDI exchanges, organizations with a number of trading partners may find it more convenient to use an EDI network service. An EDI network service is a service, typically provided by a third-party computer system that acts as an intermediary between trading partners. An EDI network service may support a large number of EDI formats and transmission methods. In some cases, the EDI network service can translate the EDI document between EDI formats prior to routing it to the second trading partner.

The underlying EDI standards limit the convenience of EDI, even when done through an EDI network service. One issue with EDI is that the relatively small number of document types supported by EDI standards or implemented by trading partners limits the types of information that can be exchanged between trading partners using EDI. In particular, an EDI standard as implemented by a set of trading partners may not support the trading partners alerting each other of potential exceptions—that is, situations in which an exchange will not occur within the requirements or expectations of the trading partners.

An example of this shortcoming can be seen with respect to late and early delivery of items ordered in EDI purchase orders. In a typical EDI exchange, a first trading partner will send an EDI PO to a second trading partner ordering items and specifying a requested delivery date. When the order is ready to ship, the second trading partner sends an EDI ASN that includes information about how many items are being shipped, physical characteristics of the items, number of packages, mode of transportation, when the order will be shipped or other information as specified by the EDI format being used. However, there may be no EDI document that the second trading partner can send to the first trading partner to indicate that a delivery will be late or early before sending the ASN prepared at the time the shipment is ready. For organizations implementing just-in-time manufacturing, both early and late delivery of components from a trading partner can disrupt the manufacturing process and have significant deleterious effects throughout a supply chain.

SUMMARY OF THE DISCLOSURE

One embodiment comprises a system for electronic data interchange (EDI) management that includes a networked EDI system configured to receive EDI documents over a network, capture EDI document data and deliver the EDI documents over the network. The EDI management system may further comprise a memory for storing the EDI document data and a prediction model, such as a delivery model, representing element information of EDI documents of a first type and a corresponding status and a processor. The processor can be configured to perform a method comprising, for an EDI document of the first type: extracting segments and elements from the EDI document of the first type and creating a document record for the EDI document of the first type, the document record comprising a hierarchy of segments and elements extracted from the EDI document;

creating a feature vector for the EDI document of the first type from the elements extracted from the EDI document of the first type; and determining a first status, such as a predicted delivery status or other classification, for the EDI document and tracking the first status by processing the feature vector for the EDI document using the prediction model and adding the first status to the document record for the EDI document of the first type, the first status accessible to a client computer via a presentation layer. According to one embodiment, the prediction model is trained using EDI document data and the processor is configured to perform periodic retraining of the prediction model with a current set of EDI document data.

According to one embodiment, creating the feature vector for the EDI document of the first type from the elements extracted from the EDI document of the first type comprises applying a set of feature mapping rules to map the elements extracted from the EDI document to a plurality of feature vectors and combining the plurality of feature vectors into a combined feature vector for the EDI document of the first type. The feature mapping rules can comprise rules for mapping elements from different segments to different ones of the plurality of feature vectors. Determining the first status for the EDI document of the first type can include applying the prediction model to the combined feature vector.

According to one embodiment, the processor is further configured to perform: receiving an EDI document of a second type; associating the EDI document of the first type with the EDI document of the second type based on at least one element of the EDI document of the first type and at least one element of the EDI document of the second type; updating the document record for the EDI document of the first type with a second status, the second status accessible via a presentation layer. The first status may be a predicted delivery status and the second status is an actual delivery status. The processor can further be configured to retrain the prediction model using the feature vector created from the EDI document of the first type and the second status.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4A and FIG. 4B illustrate one example of an EDI file.

FIG. 5A, FIG. 5B, FIG. 5C, FIG. 5D and FIG. 5E illustrate one embodiment of a translated document.

FIG. 7A illustrates an example of a segment translated into a set of name/value pairs. FIG. 7B illustrates an example of a set of feature vectors generated from the data of FIG. 7A. FIG. 7O illustrates an example of a feature vector created from the feature vectors of FIG. 7B.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
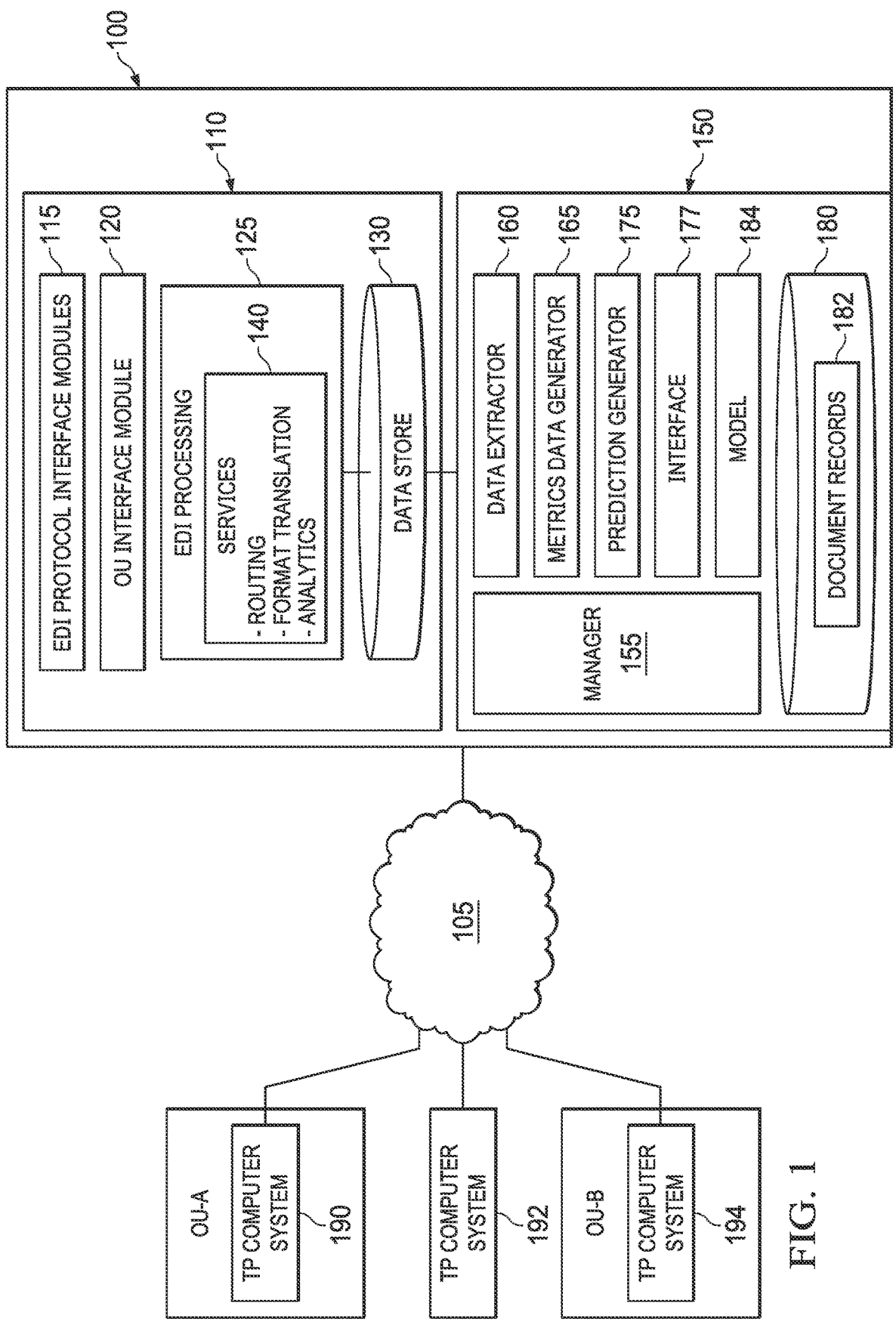
FIG. 1 is a diagrammatic representation of one embodiment of an electronic data interchange (EDI) management system operating in a network environment.

FIG. 1 is a diagrammatic representation of one embodiment of an electronic data interchange (EDI) management system 100 operating in a network environment. In the example shown in FIG. 1, a plurality of trading partners may use EDI management system 100 as an intermediary to exchange EDI documents. To this end, EDI management system 100 is configured to communicate with trading partner computer systems (TP computer system 190, TP computer system 192 and TP computer system 194) over network 105 and route EDI documents between trading partners. EDI management system 100 further applies machine learning to enhance the data exchanged via EDI and to provide functionality not available through the EDI format.

EDI management system 100 comprises an EDI exchange system 110 and an EDI analytics system 150. EDI exchange system 110 is configured to receive EDI documents from trading partner computer systems, capture the EDI document data and deliver the EDI documents to trading partner computer systems. Customer data and EDI data can be stored in a data store 130.

EDI communication interface modules 115 are configured to receive and send EDI documents according to a number of communications protocols, such as, but not limited to, FTP, telnet, e-mail, HTTPS, AS1, AS2. Data processing module 125 is configured to provide and manage a number of services 140. Non-limiting examples of services 140 may include, but are not limited to routing, format translation services, copy services, e-mail services, document tracking services, messaging services, regulatory compliance services (e.g., legal hold, patient records, tax records, employment records, etc.), encryption services, data manipulation services (e.g., validation), and analytics. As a specific example, an EDI document may be received from TP computer system 190 according to a first EDI communications protocol and EDI format, translated to a second EDI format and forwarded to TP computer system 194 according to a second EDI format. Services 140 may support a number of EDI formats, including but not limited to EDI formats specified by ANSI ASC X12, UN/EDIFACT, TRADACOMS, and GS1 EDI. In some embodiments, EDI exchange system 110 may receive a non-EDI document (a document in a non-EDI format) and translate the document to an EDI-format. EDI exchange system 110 may store EDI documents received, generated or sent by EDI exchange system 110 in data store 130 along with metadata, such as metadata identifying an entity for which the EDI document was processed.

Interface module 120 may be configured for providing user interfaces for registered operating units (OUs) such as OU-A. As an example, OU-A may own and operate an enterprise computing environment which is separate and independent of EDI management system 100 and includes a trading partner computer system 190. From the perspective of EDI management system 100, OU-A is a registered enterprise customer and, thus, systems of OU-A that utilize services 140 provided by system 110, such as TP computer system 190, are client systems of system 110. Client systems operating in the enterprise computing environment may use one or more services 140 to communicate with various systems and/or devices operating in computing environments owned and operated by trading partners of OU-A. These TPs of OU-A can be, but need not be, OUs as well. For example, in the illustrated embodiment, the trading partner operating TP computer system 192 is not an OU, but the trading partner operating TP computer system 194 is an OU (OU-B).

In one embodiment, an OU provides EDI management system 100 with information necessary to exchange documents between the OU and the OU's trading partners. For example, OU-A can specify trading partner routing information, such as names, addresses or other information that can be used to identify sending and receiving trading partners from EDI documents, and information to connect to trading partner computer systems, such as addresses and the EDI communications protocol to be used to communicate with TP computer system 190, TP computer system 192, TP computer system 194. OU-A may also specify the EDI format used by OU-A and OU-A's trading partners (e.g., the EDI format used by TP computer system 190, TP computer system 192 and TP computer system 194) and the EDI communications protocols to be used.

EDI analytics system 150 is configured to apply machine learning to enhance the data exchanged via EDI and to provide functionality based on the enhanced data not available through the EDI format. EDI analytics system 150 comprises EDI analytics manager 155, EDI data extractor 160, metrics data generator 165, prediction generator 175 and interface module 177. EDI analytics system 150 includes a data store 180 configured to store document records 182 containing EDI document data and related data. Data store 180 may comprise one or more databases, file systems or other data stores. A document record 182 can comprise a set of related information for an EDI document and may include, for example, metadata and an associated file (e.g., a translated EDI document, discussed below). In one embodiment the document record metadata is stored in a database and the associated file is stored in the database (e.g., as a binary large object) or in a filesystem. EDI analytics system 150 may further store a machine learning prediction model 184 representing features of EDI documents of one or more types.

Data extractor 160 is configured to receive transaction data, such as EDI documents and associated metadata from an EDI exchange system 110. For example, data extractor 160 may be configured to connect to data store 130, search for new data archived since the last time data extractor 160 extracted data from data store 130 and extract a copy of the new data from data store 130. In another embodiment, EDI documents are pushed to data extractor 160 by EDI exchange system 110 as EDI documents arrive at EDI exchange system 110. The data received by data extractor 160 may be compressed or encrypted. As such, data extractor 160 can be configured to decompress, decrypt or perform other operations on data extracted from data store 130.

Data extractor 160 can be configured to search the received data for EDI documents and apply translation rules to convert the EDI documents into a format that can be more efficiently used by metrics data generator 165 and prediction generator 175. According to one embodiment, data extractor 160 stores document records 182 comprising the translated EDI documents and related metadata in data store 180. The EDI data can be stored in a structured format in the document records 182. One example of a data extraction process is discussed in conjunction with FIG. 3.

Figure 6A:
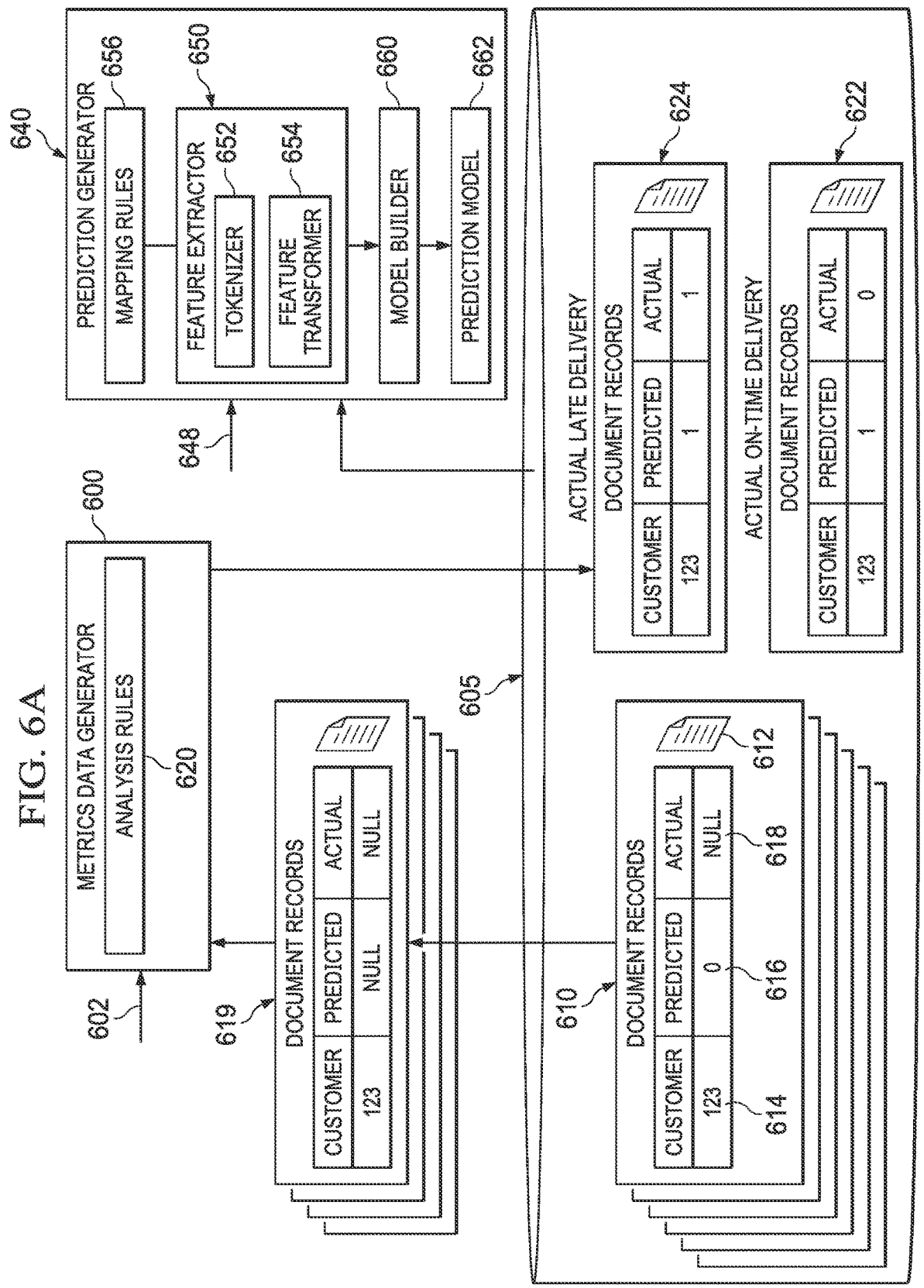
FIG. 6A is a block diagram illustrating one embodiment of a metrics data generator and a prediction generator processing document records.
Figure 9:
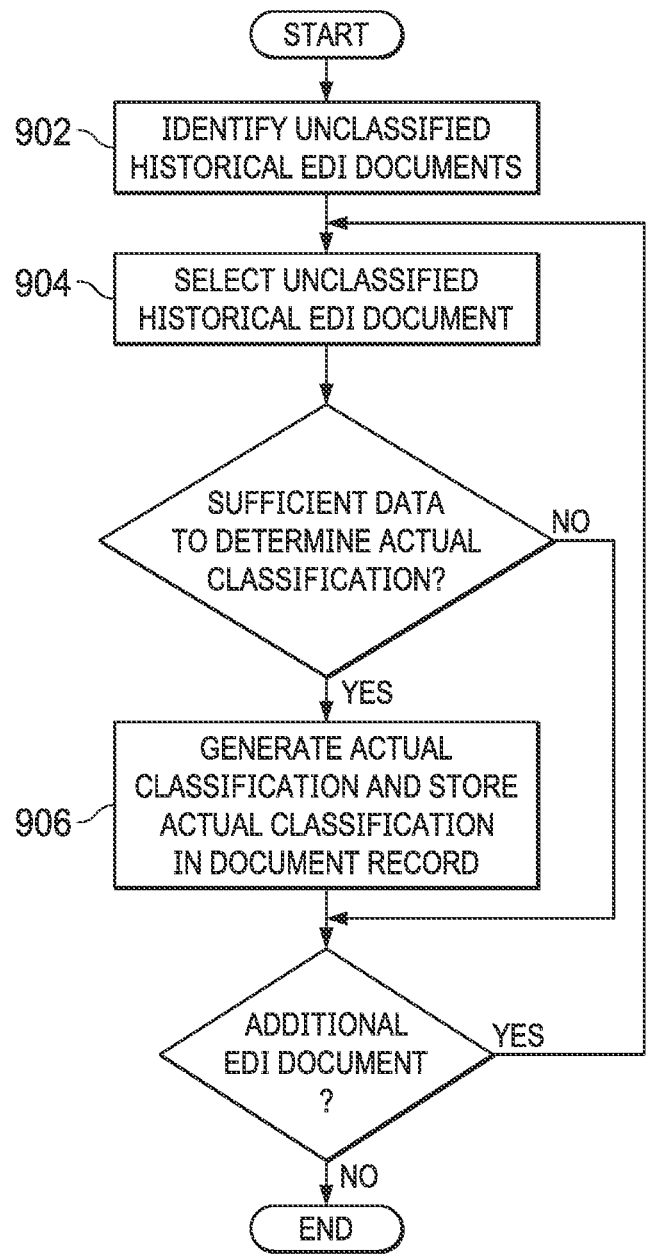
FIG. 9 is a flow chart illustrating one embodiment of a metrics data generation method.

Metrics data generator 165 analyzes the document records 182 to generate metrics data representative of the performance, efficiency, progress or other quantifiable measure that can be associated with EDI documents. In particular, metrics data may quantify whether an exchange was associated with a particular event, such as early, on-time or late delivery. For example, in one embodiment, metrics data generator 165 can analyze POs in document records 182 to derive the requested delivery dates from the orders and shipment data to derive the actual delivery of items (goods services) from shipment data that matches the orders. Based on a requested delivery date from a PO and actual delivery date from associated shipment data, metrics data generator 165 can quantify an actual delivery status for the PO; for example, 0=delivery on-time or 1=delivery late, thus classifying the POs as having an on-time delivery status or a late delivery status. While the foregoing represents a binary classification in which there are only two delivery status categories, metrics data generator 165 can be configured to categorize POs into more delivery status categories based on the timing of actual delivery; for example, 0=on-time, 1=three or fewer days late, 2=four to five days late, 3=more than five days late, 4=early delivery. As will be appreciated, delivery status is simply provided as one example of a metric that can be used to classify documents into known classes. As another example, data metrics generator 165 can analyze invoice documents and remittance advice documents to determine if an invoice was paid and classify an invoice in a payment category (e.g., paid, not paid, paid early, paid on-time, paid late or other payment category, with each payment category assigned a value). Moreover, other metrics, including combinations of metrics, may be used to classify documents. FIG. 6A and FIG. 9 illustrate example embodiments of metrics data generation.

Prediction generator 175 uses the metrics data generated by metrics data generator 165 to build (train or retrain) a machine learning prediction model 184 configured to predict events, including exceptions, for new EDI documents. More particularly, the model 184 can be configured to classify an EDI document into a class from a plurality of predefined classes, where each class corresponds to the predicted occurrence or non-occurrence of an event. Continuing with the previous examples using delivery status, prediction generator 175 can be configured to use actual delivery data, in conjunction with other data, to train a prediction model 184 to predict delivery statuses for POs. Prediction generator 175 can then apply the machine learning model 184 to new POs to provide a predicted delivery status for each new PO. The predicted delivery status for a PO can be added to the document record 182 for the PO. Similarly, in another example, prediction generator 175 can be configured to provide a predicted payment status for new invoices (e.g., an invoice will be paid, the invoice will be paid on-time, the invoice will be paid early or other payment status) or when an invoice will be paid. Prediction generator 175 may also be configured to predict other events.

According to one embodiment, prediction model 184 comprises a classifier trained to analyze patterns in input data and accurately classify the input patterns into one of several predefined classes. More particularly, in one embodiment, model 184 is a random forest classifier or other classifier configured to classify an input feature vector based on a reference set of feature vectors corresponding to the predefined classes. In such an embodiment, prediction model 184 can compare the input feature vector to the reference set of feature vectors representing the known classes to determine which of the reference set of feature vectors has the highest similarity to the input feature vector. The model 184 can output the class associated with the reference feature vector having the highest similarity to the input feature vector as a classification for the document from which the input feature vector was created. The classification may represent a prediction of an event, such as on-time or late delivery.

Figure 6B:
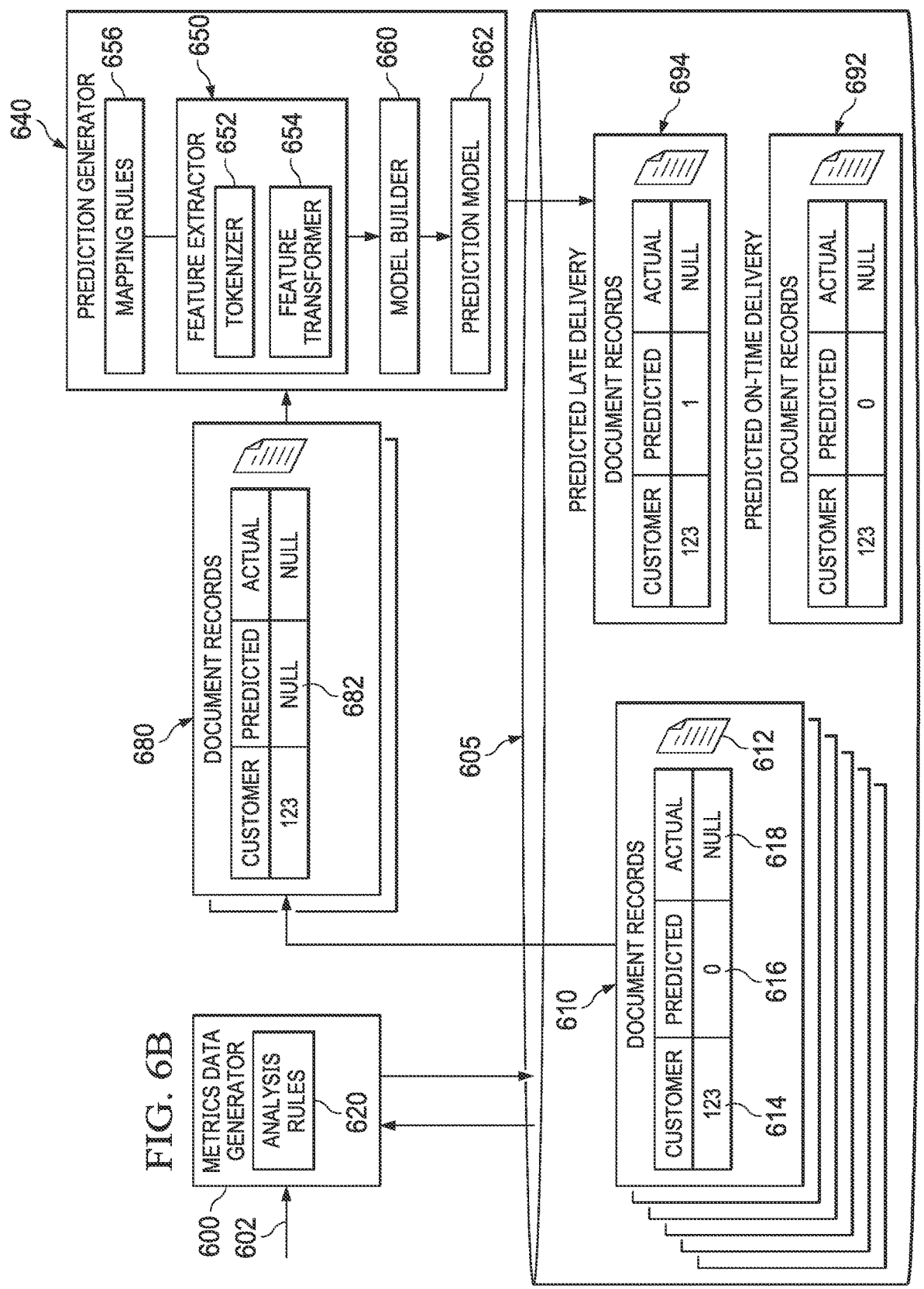
FIG. 6B is a block diagram illustrating one embodiment of a prediction generator generating a prediction.
Figure 10:
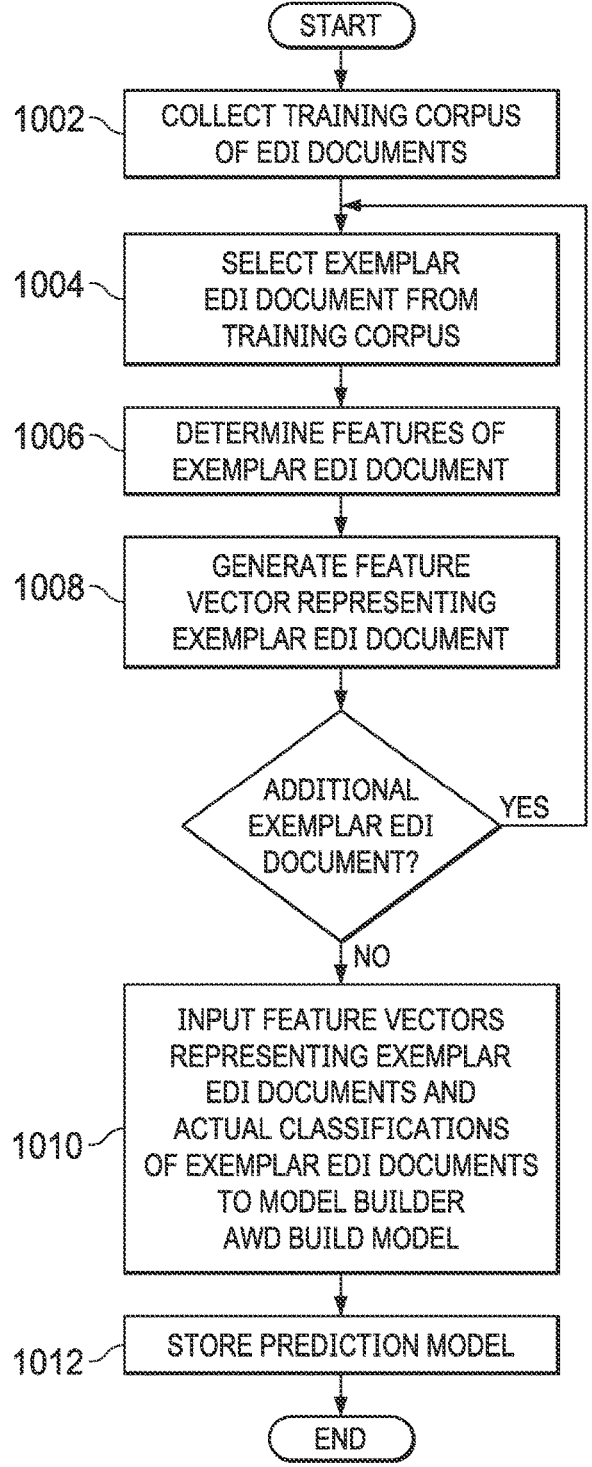
FIG. 10 is a flow chart illustrating one embodiment of a method for training a prediction model.
Figure 11:
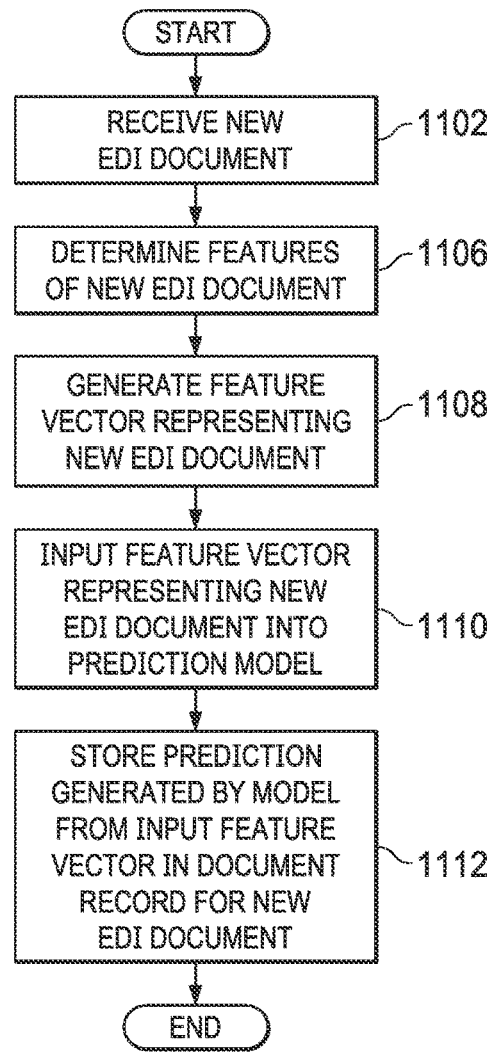
FIG. 11 is a flow chart illustrating one embodiment of a method for applying a prediction model.

Accordingly, in one embodiment, prediction generator 175 can generate a feature vector from a translated EDI document, input the feature vector into model 184 and receive a classification by 184 responsive to the input feature vector. Prediction generator 175 can associate the EDI document from which the input feature vector was generated with classification output by the model 184. For example, prediction generator 175 can generate a feature vector from a PO, input the feature vector into a first model 184 and receive a responsive output classifying the feature vector, and hence the EDI document from which it was created, as "delivery late" or "on-time" (or other class). In this example, the output of model 184 represents a prediction of whether the PO items will be delivered by the requested delivery date in the PO. As another example, prediction generator 175 can generate a feature vector from an invoice, input the feature vector into a second model 184 and receive a responsive output classifying the feature vector, and hence the EDI document from which it was created, as "will be paid" or "will not be paid" (or other class). FIG. 6A and FIG. 10 illustrate example embodiments of training a prediction model and FIG. 6B and FIG. 11 illustrate example embodiments of applying the prediction model.

Analytics manager 155 may be responsible for managing the building and application of models. For example, analytics manager 155 may include a scheduler that causes data extractor 160 to extract data from data store 130 according to a schedule and coordinates processing of the extracted data by metrics data generator 165 and prediction generator 175.

Interface module 177 can be configured to provide one or more interfaces for an OU that includes notifications of predictions determined by prediction generator 175. Interface module 177 may provide a portal through which an OU can view the notifications. In other embodiments, interface module 177 can be configured to push notifications to the OU via e-mail, SMS or other configured mechanism. In particular, predictions of events can be surfaced to the user. For example, interface module 177 may provide notifications of predicted late or early delivery, notifications that invoices will or will not be paid or other notifications.

EDI management system 100 may be embodied on one or more computer systems. A suitable computer system may comprise a data processing system having one or more processors coupled to one or more memories. EDI exchange system 110 and EDI analytics system 150 may share hardware and software resources. In one embodiment, EDI management system 100 may be implemented in a distributed computer network, such as a cloud computing environment.

According to one embodiment EDI exchange system 110 may comprise a "trading grid" as described in U.S. patent application Ser. No. 15/651,761, entitled "Systems and Methods for Intelligent Document-Centric Orchestration through Information Exchange Platform," filed Jul. 17, 2017, which is hereby fully incorporated by reference for all purposes. In such an embodiment, EDI analytics system 150 may be a backend system that operates in the trading grid to provide a service 140. In another embodiment, EDI analytics system 150 may be a system that has access to transaction data stored by EDI system 110, but is not managed by the trading grid.

Figure 2:
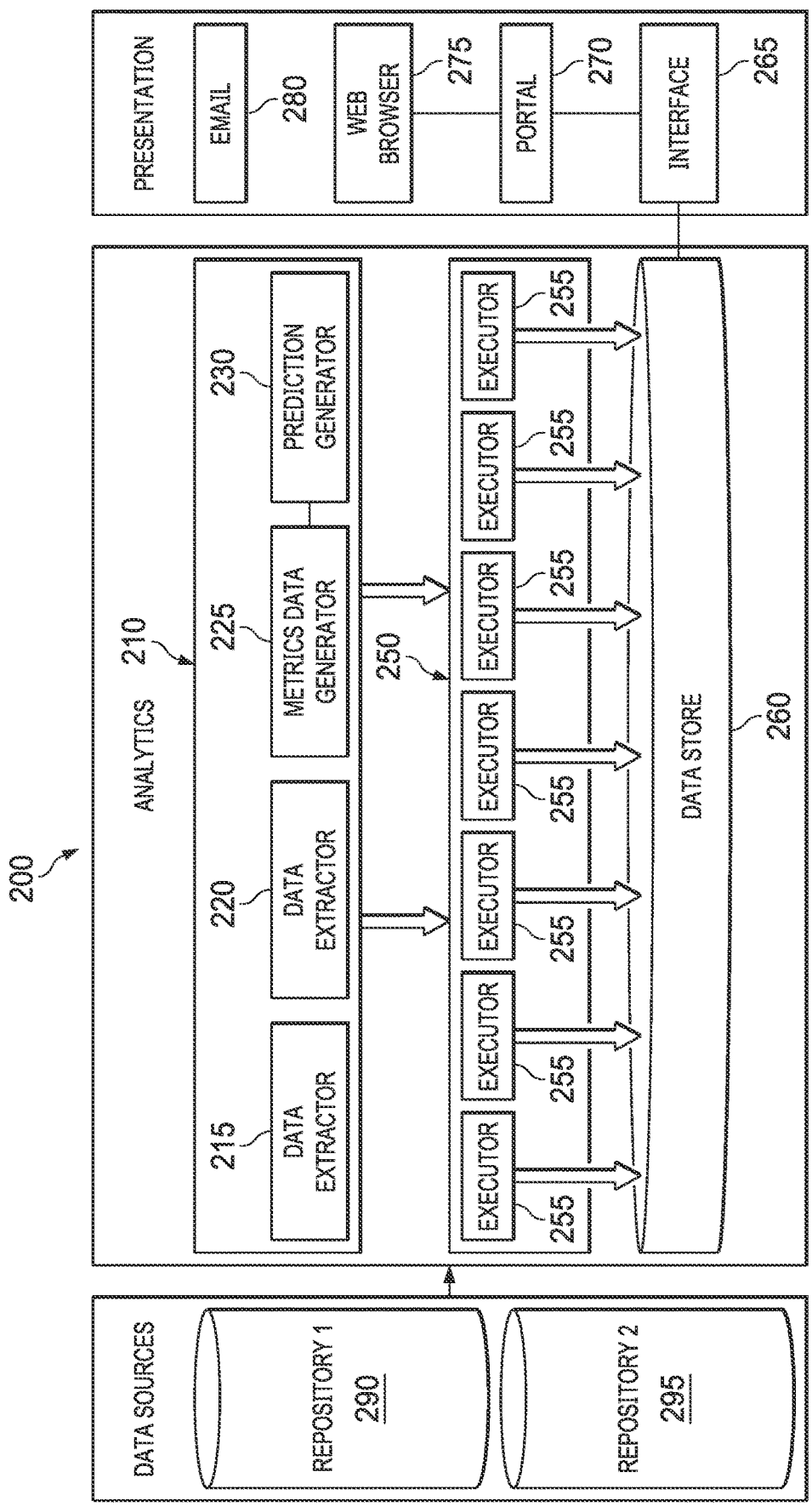
FIG. 2 is a diagrammatic representation of one embodiment of an EDI analytics system that can be implemented in a distributed computing environment, such as a cloud computing environment.

An EDI analytics system, such as EDI analytics system 150, may be implemented using a variety of architectures. FIG. 2, for example, is a diagrammatic representation of one embodiment of an EDI analytics system 200 that can be implemented in a distributed computing environment, such as a cloud computing environment.

The EDI analytics system 200 comprises a set of applications 210 that are executed by executors 255 (agents) running on distributed nodes. A resource manager 250 schedules executors 255 on the distributed nodes to execute applications 210. The applications 210 process data obtained from data sources 205 to generate processed data and process the processed data to generate further processed data. Executors 255 write to and read from a distributed data store 260 in which data obtained or generated through execution of applications 210 is stored.

According to one embodiment, applications 210 may be distributed applications executed by an engine for large scale data processing in a distributed processing framework. By way of example, but not limitation, applications 210 may be APACHE SPARK applications implemented in an APACHE HADOOP® framework, resource manager 250 may comprise a HADOOP YARN and data store 260 may comprise a HADOOP distributed file system (HDFS) (APACHE SPARK from the APACHE SOFTWARE FOUNDATION is an engine for large-scale data processing and APACHE HADOOP from the APACHE SOFTWARE FOUNDATION is an open-source framework for distributed processing).

As OUs transact with trading partners via an EDI exchange system, transactions may be placed in repositories of different types. The repositories used will depend on the EDI exchange system. For example, the OPEN TEXT GXS TRADING GRID® stores transaction data in multiple repositories including a DSM repository and an MS Archive repository. EDI analytics system 200 may extract data from multiple data sources having a variety of data formats. To this end, applications 210 may comprise extractors configured to extract data from particular data sources. In the embodiment illustrated, EDI analytics system 200 comprises an extractor 215 dedicated to extracting data from a data source 290 of a first type, say an MS Archive repository, and data extractor 220 dedicated to extracting data from a data source of second type, say a DSM repository.

Data extractor 215 is executable to connect to data source 290, search for new data archived since the last time data extractor 215 extracted data from data source 290 and extract a copy of the new data from data source 290. Similarly, data extractor 220 is executable to connect to data source 295, search for new data archived since the last time data extractor 220 extracted data from data source 295 and extract a copy of the new data from data source 295.

The data extracted from data sources 290 and 295 may be compressed or encrypted. As such, data extractors 215 and 220 can be configured to decompress, decrypt or perform other operations on data extracted from data sources 290 and 295. Data extractors 215 and 220 search the data extracted from the respective data source for EDI documents, extract EDI data from the EDI documents and store the extracted EDI document data in document records having another format. The document records containing the extracted EDI document data may be stored in data store 260. One example of an extraction process that can be performed by a data extractor 215 or data extractor 220 is discussed in conjunction with FIG. 3.

Metrics data generator 225 analyzes the document records to generate metrics data representative of the performance, efficiency, progress or other quantifiable measure that can be associated with EDI documents. Prediction generator 230 builds (trains or retrains) a machine learning prediction model using metrics data determined by metrics data generator 225 for historical records and uses the prediction model to analyze new EDI documents to classify the new EDI documents into predefined classes. The predefined classes may correspond to the occurrence or non-occurrence of an event. Prediction generator 230 can store the prediction output by the prediction model in a document record for the EDI document for which the prediction was generated. FIG. 6A and FIG. 9 illustrate example embodiments of metrics data generation, FIG. 6A and FIG. 10 illustrate example embodiments of training a prediction model and FIG. 6B and FIG. 11 illustrate example embodiments of applying the prediction model.

Figure 8:
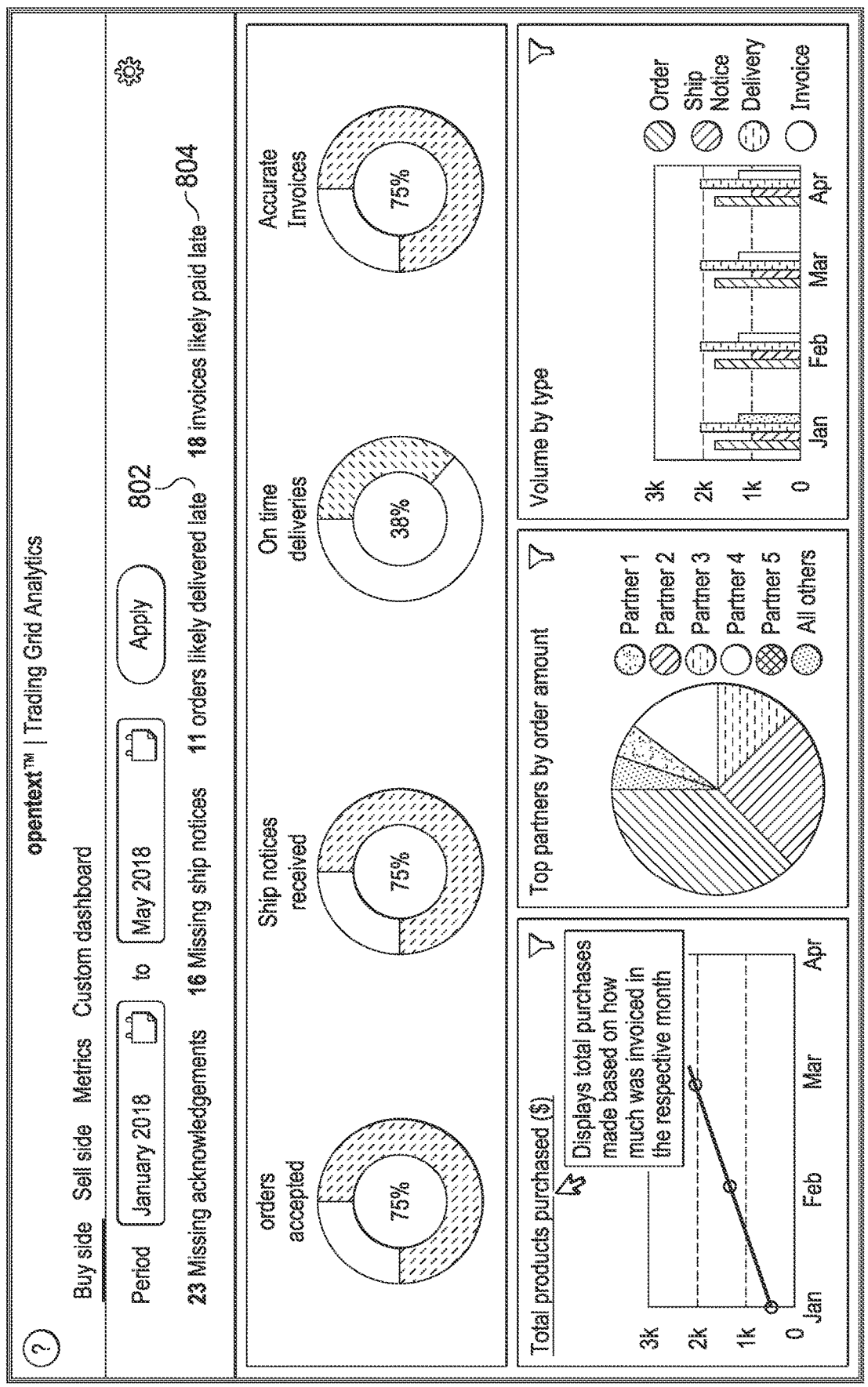
FIG. 8 illustrates one embodiment of a portal page.

A presentation layer 207 may include an interface module 265 that can access distributed data store 260 and provide a portal 270 accessible by a client web browser 275. A user at a client computing device may access the portal 270 and specify certain parameters. Interface module 265 can select a particular set of data in the data store 260 based on system or user specified parameters, process the set of data and generate web pages based on the set of data for presentation by the web browser 275 via the portal 270. In particular, interface module 265 may generate web pages that summarize or otherwise provide predicted metrics data. FIG. 8, for example, illustrates one embodiment of a dashboard that may be provided to an OU user that alerts the user of predicted late deliveries and late payments.

EDI analytics system 200 may further include notification modules configured to analyze data in data store 260 and automatically send notifications to OUs. In the illustrated embodiment, for example, EDI analytics system 200 may further include an e-mail notification module 280 configured to automatically generate e-mails to OUs. The notification modules can be configured, for example, to generate notifications when certain predicted metrics data is detected in data store 260. For example, a notification module may watch for predicted delivery status data indicating that deliveries are predicted to be late and, in response to detecting a predicted late delivery status for a PO, e-mail the OU associated with the PO to alert the OU that the delivery is predicted to be late. As another example, a notification module may watch for predicted delivery status data indicating that deliveries are predicted to be late and, in response to detecting a predicted late delivery status for a PO, send an SMS to the OU associated with the PO to alert the OU that the delivery is predicted to be late. Similarly, a notification module may watch for predicted payment status data indicating that payments are predicted to be late and, in response to detecting a predicted late payment status for an invoice, e-mail, SMS or otherwise notify the OU associated with the invoice to alert the OU that the payment is predicted to be late.

Figure 3:
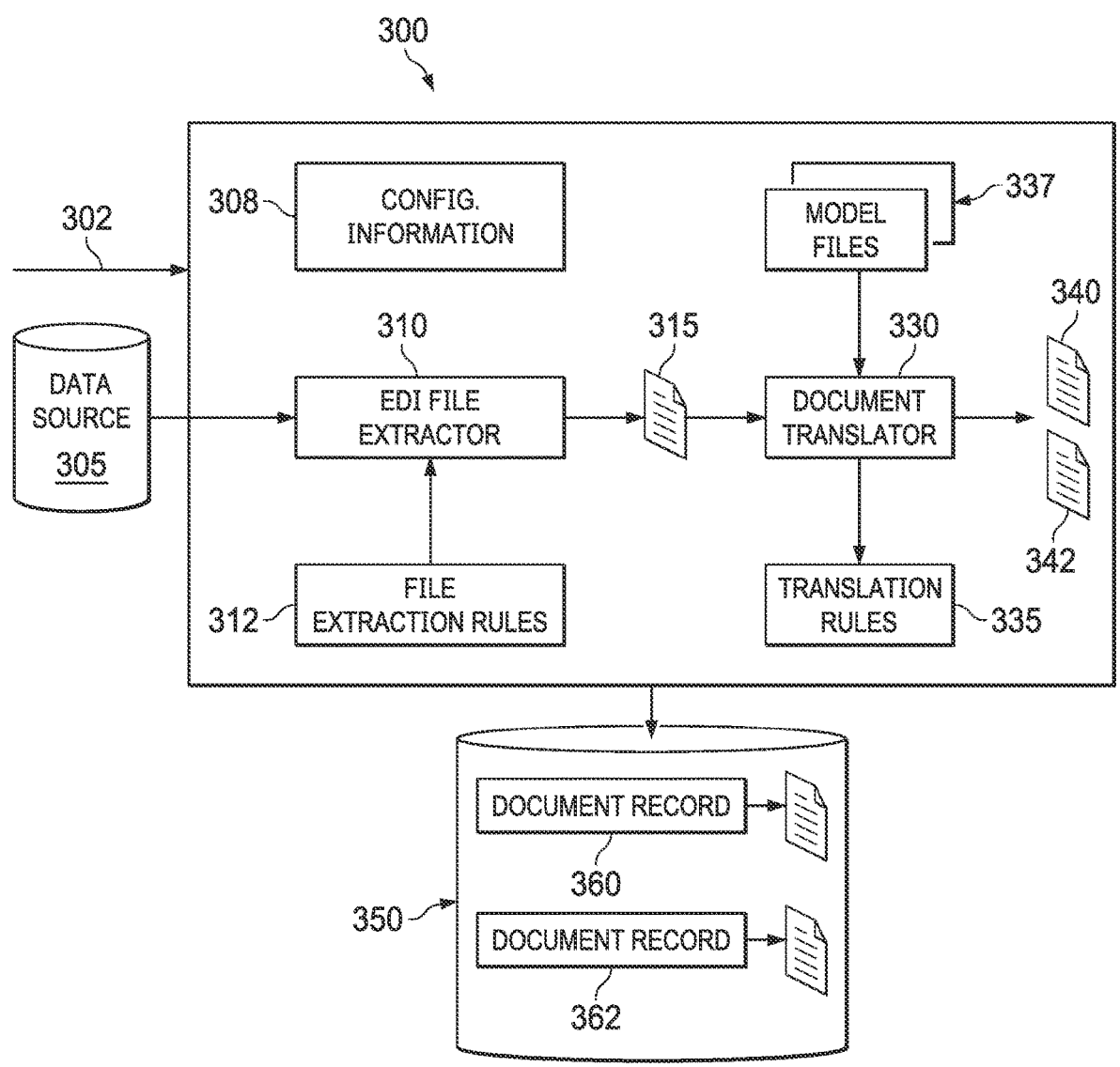
FIG. 3 is a block diagram illustrating one embodiment of a data extractor extracting data from a data source to create document records.

FIG. 3 is a block diagram illustrating one embodiment of a data extractor 300 extracting data from a data source 305 to create document records 360 and 362 in a data store 350. According to one embodiment, data store 350 is a data lake that includes document records for a large number of EDI documents of various types (purchase orders, ASNs, invoices and other documents) associated with a number of customers (OUs).

Data extractor 300 can be configured via configuration information 308 to connect to and extract data from a data store. Responsive to a signal 302 to perform an extraction job, such as responsive to receiving a task from a resource manager to perform an extraction job, data extractor 300 connects to data source 305, searches for new data archived since the last time data extractor 300 extracted data from data source 305 and extracts a copy of the new data from data source 305. The data may be compressed or encrypted. As such, data extractor 300 is configured to decompress, decrypt or perform other operations on data extracted from data source 305.

The data extracted from data source 305 may include EDI files that contain EDI documents. In general, EDI file formats are well defined by EDI standards or the EDI system that archived the files. For example, EDI files may be .txt files that follow a particular naming convention based on the EDI exchange system that stores the files. Thus, file extraction rules 312 can be established to allow data extractor 300 to extract EDI files from data source 305. A file extractor 310 can execute rules 312 to search the data extracted from data source 305 to locate EDI files from the data read from data source 305 and extract the EDI files, such as EDI file 315.

Data extractor 300 comprises a translator 330 that executes translation rules 335 to translate EDI file 315 into one or more translated EDI documents containing EDI document data formatted according to a hierarchical structure. The translation rules 335 may use model files 337 that describe the structure and layout of different EDI formats of EDI data, such as ANSI X12, UN/EDIFACT, and TRADACOMS formats, to translate the EDI data into the hierarchical format.

Turning briefly to FIG. 4A, one example of an EDI file 400 according to an ANSI X12 standard is provided. EDI file formats are generally text files with data separated by segments, elements and components (sub-element) delimiters (separators). A segment comprises a series of data elements. A data element may be a simple data element or a composite element containing two or more simple data elements, referred to as components. According to ANSI X12 standards, a tilde delimits segments, an asterisk separates data elements and a hat separates components of a composite element. For convenience, FIG. 4B illustrates EDI file 400 of FIG. 4A with the segments broken out so that each segment starts on a new line.

Each segment starts with a code that identifies the segment (e.g., ISA, GS, ST, BEG, CUR, DTM, LIN, RID, N1, N2, IN2, N3, N4, PO1, RID, N2, N4, AMT, SE, GE, IEA). The codes, their meanings and whether the segments are mandatory or optional are defined by ANSI X12. The EDI standard further specifies for each element in a segment, a data element id, whether the data element is mandatory or optional, the data type or types, and, in some cases, the permissible values and the meaning of the values.

Some segments define an envelope that applies to all segments within the envelope. The envelopes contain interchange metadata and one or more EDI documents, such as information about trading partners (e.g., sender, receiver and others). ISA-IEA defines an interchange envelope 402, GS-GE defines a group envelope 404 in an interchange and ST-SE defines a transaction set inside the group envelope 406. A transaction set typically represents an EDI document, such as a purchase order. For example, transaction set 406 is a purchase order as indicated by the value "850" in data element ST01 (first data element in the ST segment).

An EDI standard can further define loops. A loop is a set of related segments that are grouped together to represent a block of related information. For example, in loop 408, the PO1 segment 410 represents a line item in the purchase order and the PID segment represents a product/item description for that line item. Loops may be nested. For example, loop 428 is nested in loop 408. Moreover, loops may repeat. For example, if there were multiple line items in the purchase order 406, the loop 408 would repeat with the data elements populated with values appropriate for each additional line item.

A loop begins with a starting segment, such as PO1 segment 410, defined by the applicable EDI standard and all other segments in the loop can be considered children of that segment. The starting segment can only appear once in a loop and, thus, each new occurrence of the starting segment is considered a new loop. A number of common loops are defined by the EDI standards, Thus, while EDI file 400 does not provide explicit structural information to indicate that the PID, N1, N2 and N4 segments of loop 408 are children of PO1 segment 410, the structure is implied based on the ANSI X12 standard. In addition, the ANSI X12 standard allows loops that are not otherwise defined by the standard to be delimited using LS (loop start), LE (loop end) segments.

Returning to FIG. 3, a model file 337 may specify the segment codes and separators, the data element separators, component separators, element ids, the loop start segments, the segments that can be in a loop after a loop start segment, hierarchical relationships between segments and between data elements and segments, the segment codes used to identify envelopes and documents and other information that can be used to build a hierarchical representation of an EDI document. Translation rules 335 are executable to map EDI data extracted from an EDI file into a hierarchical format based on a model file 337.

In translating the EDI file 315, data extractor 300 can split EDI documents in EDI file 315 into separate translated documents. In one embodiment, data extractor 300 identifies the segments that delimit EDI documents within file 315 and creates a translated document for each transaction. Thus, if there are two purchase orders in EDI file 315, one purchase order can be translated into translated document 340 and the other purchase order translated into document 342, each containing extracted EDI document data from the respective purchase order.

Each translated document may also hold a copy of the envelope metadata from the EDI envelopes that contained the EDI document. The envelope metadata may include, for example, sender, receiver, tracking numbers and other information according to the EDI standard used. Thus, each of translated documents 340 and 342 can contain, along with the segment data for the corresponding purchase order, the ISA segment data for the interchange envelope in which the corresponding purchase order was contained and the GS/GE segment data for the group envelope in which the corresponding purchase order was contained, and the segment data for the purchase order. If the purchase orders corresponding to translated documents 304 and 342 are in the same ISA envelope and group envelope in EDI file 315, translated documents 340 and 342 may contain the same envelope metadata. In addition to the data extracted from the EDI file 315, the data extractor 300 can insert metadata that was extracted from data source 305 or generated by data extractor 300 into a translated document.

Thus, for example, on extracting EDI file 315, data extractor 300 may determine that EDI file 315 is an ANSI X12 file, load the appropriate model file 337 and execute translation rules 335 to translate the EDI file into one or more translated documents in which the EDI document data is organized according to the hierarchy defined in the model file 337. According to one embodiment, extractor 300 creates a translated document for each transaction set (ST-SE). A translated document for a transaction set can contain the ISA envelope metadata and the group envelope metadata of the group envelope containing the transaction set. During the translation process, the data extractor 300 maintains the hierarchical layout representation of the EDI document as specified in the model file 337. The translated documents 340 and 342 thus retain the structure specified in the model file 337 for how data segments and elements are related to each other.

Data extractor 300 stores document records in data store 350. The document records may comprise the translated EDI document having a hierarchy of segments and elements extracted from the EDI document in the EDI format. For example, document record 360 may include translated EDI document 342 and document record 362 may include translated EDI document 342. Thus, through the process of extraction and translation, data extractor 300 can create a document record for each EDI document (e.g., a purchase order, ASN or other EDI document) discovered in EDI file 315. Document records may include additional document record metadata. For example, a document record may include metadata such as the customer (OU) with which the record is associated, the type of document (e.g., purchase order, ASN, invoice, remittance advice documents), metrics data extracted from data source 305 or generated by the EDI analytics system or other information, FIG. 5A, FIG. 5B, FIG. 5C, FIG. 5D and FIG. 5E illustrate one embodiment of a translated document 500 for purchase order 406 (FIG. 5A, FIG. 5B, FIG. 5O, FIG. 5D and FIG. 5E are referred to herein collectively as FIG. 5). In the embodiment of FIG. 5, translated document 500 is a JSON formatted document comprising a hierarchical tree structure of segments, elements and components extracted from the EDI file 400. As can be noted, the hierarchy includes the segments, elements and components extracted from the envelope and purchase order. Thus, in addition to preserving the EDI document (purchase order) data in the translated document 500, the data extractor can preserve the envelope metadata for the purchase order in the translated document 500. The order and level of each segment and data element (including component) in the hierarchy can be specified by the model file 337 used to generate the translated document 500.

The fields in the JSON format translated document 500 are named based upon the segment name, element position, and component position. According to one embodiment, data elements (including components) are positioned as children of the segments in which they appear. Segments of a document are structured as children of the transaction set segment. Moreover, segments of a loop are positioned as children of the loop start segment. For example, hierarchical structure portion 502 (FIG. 5O and FIG. 5D) corresponds to loop 408 with the PID and N1 segments of loop 408 stored as children of the PO1 loop start segment. Similarly, hierarchical structure portion 504 (FIG. 5C and FIG. 5D) of translated document 500 corresponds to the nested loop 428 with the N2 and N4 segments stored as children of the loop start N1 segment and grandchildren of the PO1 loop start segment. Hierarchical structure portion 506 (FIG. 5B and FIG. 5O) corresponds to loop 418.

In addition to data extracted from the EDI file, translated document 500 includes additional metadata 510, 512, 514, 516 that was extracted from the data source or generated by the data extractor.

Translated EDI documents, such as translated document 500, can be stored along with additional metadata as document records in a data store. The document records, including the translated EDI documents, can be processed by a metrics data generator and a prediction generator. FIG. 6A is a block diagram illustrating one embodiment of a metrics data generator 600 and prediction generator 640 processing document records 610 stored in a data store 605. According to one embodiment, data store 605 is a data lake that includes document records for a large number of EDI documents of various types (purchase orders, ASNs, invoices, remittance advice documents and other documents) associated with a number of customers (OUs).

Document records 610 may include EDI document data extracted from EDI documents (e.g., by a data extractor). For example, a document record 610 may include a translated EDI document 612 containing a hierarchy of segments and elements extracted from an EDI document according to an EDI format, along with associated metadata. In the illustrated embodiment, the document record metadata may include a customer attribute 614 indicating the customer (OU) with which the EDI document is associated, a predicted classification attribute 616 and an actual classification attribute 618. At any given time, document records 610 may include records for new EDI documents and records for historical EDI documents.

Metrics data generation module 600 can receive a trigger input 602, such as a task from a resource manager scheduler to initiate a processing job. Responsive to input 602, metrics data generator 600 connects to data source 605 and identifies a set of historical document records 619 from document records 610 to process. Historical document records 619 may comprise records for EDI documents that are older than a threshold, documents records for which there is sufficient data for metrics data generator 600 to generate metrics data to classify the corresponding EDI documents or records that meet other criteria.

Metrics data generator 600 processes the document records 619 according to a set of analysis rules 620 to generate metrics data representative of the performance, efficiency, progress or other quantifiable measure that can be associated with the historical EDI documents. In particular, metrics data generator 600 may generate metrics data that classifies the EDI documents into predefined classes. Metrics data generator 600 may, in some embodiments, process historical document records according to a schedule, such as daily.

According to one embodiment, metrics data generator 600 is configured to access document records 619 and identify EDI documents of a first type, for example POs, and EDI documents of a second type, for example ASNs. Metrics data generator 600 associates the documents of the first type with documents of the second type based on data elements from the EDI documents of the first type and data elements of the EDI documents of the second type. For example, metrics data generator 600 may access a translated PO document in a document record 619 and identify a PO number (a purchase order id that identifies that purchase order according to the EDI specification) contained in the translated PO. Furthermore, metrics data generator 600 can search records 610 for a corresponding ASN document containing the PO number or other data that can be correlated to the PO using the PO id or other data contained in the ASN. If a corresponding ASN is found, metrics data generator associates the ASN with the PO. As another example, metrics data generator 600 may access a translated invoice document in a document record 619 and identify an invoice number (an invoice id that identifies that invoice according to the EDI specification) contained in the translated invoice. Furthermore, metrics data generator 600 can search records 610 for a corresponding remittance advice document containing the invoice number or other data in the remittance advice document that can be correlated to the invoice using the invoice id or other data contained in the remittance advice document. If a corresponding remittance advice document is found for an invoice, metrics data generator 600 associates the remittance advice document with the invoice. Using analysis rules 620, metrics data generator 600 can generate metrics data for the EDI document of the first type based on the associated EDI document of the second type.

The metrics data may represent a predefined class corresponding to the occurrence or non-occurrence of an event. As an example, metrics data generator 600 can be configured to parse a translated PO document from a document record 619 to extract a requested delivery date for the PO. Further, metrics data generator 600 can parse an associated translated ASN document to determine an actual delivery date for items ordered in the PO. If the actual delivery date from the ASN data is after the requested delivery date from the associated PO data, metrics data generator 600 can output a value for an actual classification attribute 618 (e.g., an actual delivery status attribute) in the document record for the PO, the value indicating that the delivery was late. If the actual delivery date from the ASN data is on or before the requested delivery date from the associated PO, metrics data generator 600 can assign the actual classification attribute 618 a value indicating that the delivery was on time.

As another example, metrics data generator 600 can be configured to parse a translated invoice document from a document record 619 to extract a payment due date for the invoice. Further, metrics data generator 600 can parse an associated translated remittance advice document to determine an actual payment date for the invoice. If the actual payment date from the remittance advice data is after the payment due data from the associated invoice data, metrics data generator 600 can output a value for an actual classification attribute (e.g., an actual payment status attribute) in the document record for the invoice, the value indicating that the payment was late. If the actual payment date from the remittance advice data is on or before the payment due date from the associated invoice, metrics data generator 600 can assign the actual classification attribute a value indicating that the payment was on time.

Thus, metrics data generated by metrics data generator 600 can classify EDI documents into multiple classes. As illustrated, for example, metrics data generated by metrics data generator 600 can classify POs into an on-time delivery class 622 containing POs for which the associated ASNs indicated on-time delivery and a late delivery class 624 containing POs for which the associated ASNs indicated late delivery. Similarly, metrics data generated by metrics data generator 600 can classify invoices into an on-time payment class containing invoices for which the associated remittance advice documents indicated on-time payment and a late payment class containing invoices for which the associated remittance advice documents indicated late payment. While only two classes are used in the foregoing examples, metrics data generator 600 can be configured to generate metrics data that classifies EDI documents into any number of classes. Moreover, in addition or in the alternative, metrics data may classify EDI documents based on any number of other metrics. Furthermore, metrics data can classify other types of documents depending on configuration.

Prediction generator 640 can receive a trigger input 648, such as a task from a resource manager scheduler to initiate a training job. In some cases, the task may specify the set of data over which the model is to be trained. For example, in one implementation, a task may cause prediction generator 640 to build a prediction model using records associated with a specific customer. Prediction generator 640 may access document records 610 for historical documents that have been classified and that meet task criteria for training a model. Prediction generator 640 may, in some embodiments, process historical document records according to a schedule. For example, monthly using records from the past 90 days.

Prediction generator 640 is configured to collect exemplars of each class for which the model is being trained and create feature vectors for the exemplars. The exemplar EDI documents represent a training corpus for training a prediction model 662. A feature extractor 650 transforms each exemplar EDI document in the training corpus to a corresponding feature vector. The feature vectors are input to a model builder 660 as a training set used to train the model 662. According to one embodiment, feature extractor 650 transforms the EDI documents to feature vectors based on feature mapping rules 656 that specify which segments and data elements are to be transformed into features, rules for identifying features from the EDI documents and rules for transforming features to feature vectors (e.g., a target feature dimension size or other information used to configure feature extractor 650).

Feature transformer 654 processes mapping rules 656 to map the elements extracted from EDI documents to feature vectors. Feature transformer 654 can create a plurality of feature vectors from each exemplar EDI document and combine the feature vectors created from the exemplar EDI document into a single reference feature vector representing that exemplar EDI document. In one embodiment, feature extractor 650 includes a tokenizer 652 that tokenizes each exemplar EDI document in the training corpus to break each document down into its individual terms, which can be considered the features. Feature transformer 654 transforms the tokenized results into a set of feature vectors representing the exemplar EDI documents. The feature vector for an exemplar EDI document can be created from the terms extracted from the EDI document.

Feature extractor 650 can thus produce a reference feature vector for each exemplar EDI document, each feature vector mathematically representing the corresponding EDI document from which it was created. Feature extractor 650 outputs the reference feature vector generated for each exemplar EDI document in the training corpus and the corresponding EDI document actual classification generated by metrics data generator 600 for each exemplar EDI document in the training corpus to a model builder 660 which applies machine learning techniques to the reference feature vectors and actual classifications to build a prediction model 662. The prediction model 662 has a reference set of feature vectors for each class, the features vectors representing element information from the exemplar EDI documents.

Using model 662, an input feature vector can be compared to the reference set of feature vectors representing the known classes to determine the reference feature vector that has the highest similarity to the input feature vector. The model 662 can output the class associated with the reference feature vector having the highest similarity to the input feature vector as a classification for the document from which the input feature vector was created. The classification may represent a prediction of an event.

For example, to train a model 662 to predict which POs will result in late delivery and which POs will result in on-time delivery, prediction generator 640 can collect translated PO documents from on-time delivery class 622 and translated PO documents from late delivery class 624 as exemplars. Feature extractor 650 can produce a reference feature vector for each exemplar PO document, each feature vector mathematically representing the corresponding PO document from which it was created. In this example, feature extractor 650 outputs the reference feature vector generated for each exemplar PO document in the training corpus and the corresponding PO document actual classification generated by metrics data generator 600 for each exemplar PO document in the training corpus to model builder 660 which applies machine learning techniques to the reference feature vectors and actual classifications to build a prediction model 662. The model builder 660 can associate feature vectors generated from class 622 with a first class (e.g., on-time delivery) and feature vectors generated from class 624 with a second class (late delivery). The prediction model 662 thus has a reference set of feature vectors for each class, the features vectors representing element information from the exemplar PO documents.

Using the model 662 trained in this manner, an input feature vector generated from a new PO can be compared to the reference set of feature vectors representing the known classes to determine the reference feature vector that has the highest similarity to the input feature vector. The model 662 can output the class associated with the reference feature vector having the highest similarity to the input feature vector as a classification for the document from which the input feature vector was created. The classification, in this example, represents a prediction of on-time delivery or late delivery.

As another example, to train a model 662 to predict which invoices will result in late payment and which invoices will result in on-time payment, prediction generator 640 can collect translated invoice documents from an actual on-time payment class and translated invoice documents from an actual late payment class as exemplars. Feature extractor 650 can produce a reference feature vector for each exemplar invoice document, each feature vector mathematically representing the corresponding invoice document from which it was created. In this example, feature extractor 650 outputs the reference feature vector generated for each exemplar invoice document in the training corpus and the corresponding invoice document actual payment classification generated by metrics data generator 600 for each exemplar invoice document in the training corpus to model builder 660 which applies machine learning techniques to the reference feature vectors and actual classifications to build a prediction model 662. The model builder 660 can associate feature vectors generated from the actual on-time payment class with a first class (e.g., on-time payment) and feature vectors generated from the translated EDI document from class 624 with a second class (late delivery). The prediction model 662 thus has a reference set of feature vectors for each class, the features vectors representing element information from the exemplar invoice documents.

Using the model 662 trained in this manner, an input feature vector generated from a new invoice can be compared to the reference set of feature vectors representing the known classes to determine the reference feature vector that has the highest similarity to the input feature vector. The model 662 can output the class associated with the reference feature vector having the highest similarity to the input feature vector as a classification for the document from which the input feature vector was created. In this example, the classification represents a prediction of an on-time payment or late payment.

Prediction generator 640 may, in some embodiments, process exemplar historical document records—that is, document records for which metrics data generator 600 has generated metrics data indicative of class—according to a schedule, such as every several months, using recent records (e.g., records from the last 90 days or other configurable amount). The prediction model 662 can thus be automatically retrained with a current set of EDI document data so that the prediction model stays up to date with new trends.

With reference to FIG. 6B, prediction generator 640 can periodically search data store 605 for new document records 680 and, if it finds a document record meeting particular criteria, apply a prediction model 662 to the EDI data from the document record 680. For example, prediction generator 640 can review data store 605 daily for new PO document records, invoice document records or other document records. When prediction generator 640 finds a new document record that meets the criteria, feature extractor 650 can create a feature vector for the EDI document according to mapping rules 656 as discussed above with respect to exemplar documents. Feature extractor 650 can input the feature vector into the appropriate model 662 (e.g., the model developed for the document type and customer indicated in a document record 680). Model 662 can compare the input feature vector for an EDI document to the reference set of feature vectors representing the known classes to determine which of the known class feature vectors has the highest similarity to the input feature vector and thus classify the input feature vector. For example, prediction generator 640 can predict a delivery status for an EDI document using model 662 that classifies a PO into a predicted on-time delivery class 692 and a predicted late delivery class 694. As another example, prediction generator 640 can predict a payment status for an EDI document using model 662 that classifies invoices into a predicted on-time payment class and a predicted late payment class. As illustrated by the value set for the predicted metrics data attribute 616 in FIG. 6B, prediction generator 640 can track the delivery status (or other status) by adding the predicted classification (e.g., predicted delivery status) to the document record for the EDI document.

If shipment data (e.g., an ASN) is later received for a record in class 692 or 694, the record may be processed as a record 619 to determine an actual shipment status. Moreover, the record can be used as an exemplar document in a subsequent training of the delivery status prediction model 662. Similarly, if payment data (e.g., a remittance advice document) is later received for an invoice, the invoice can be processed to determine an actual payment status and be used in a subsequent training of a payment status prediction model 662.

Figure 7C:
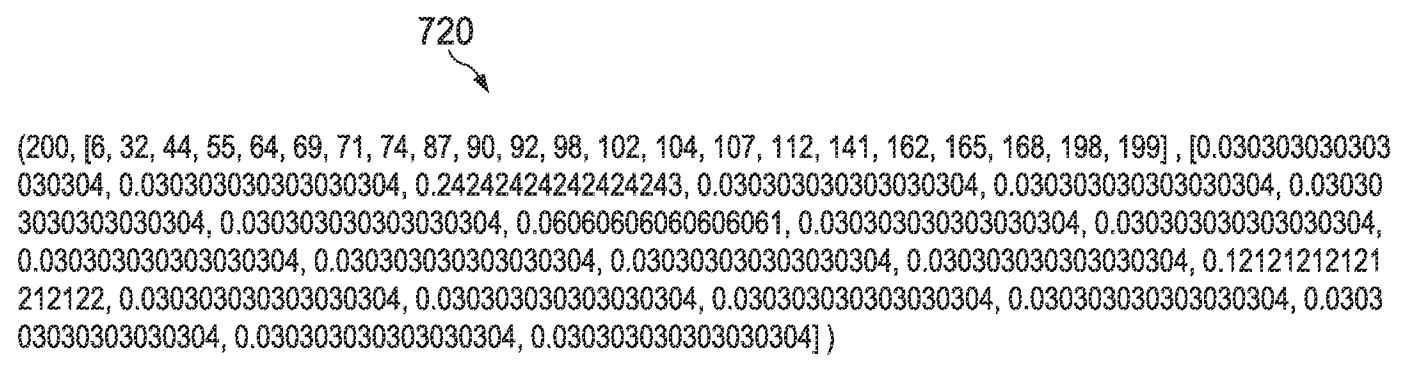

With further reference to FIG. 7A, FIG. 7B and FIG. 7C, the content of an EDI document is translated into a set of name/value pairs that is, in turn, used to create the numeric features used to build a prediction model. FIG. 7A illustrates a sample EDI segment 700 from a translated EDI document (an exemplar EDI document or EDI document for which a prediction is being made) tokenized into name/value pairs represented in table 702. Each row in Terms column 704 can be used as a feature data set that feature transformer 654 maps to a feature vector.

FIG. 7B illustrates an example set of feature vectors 710 representing the data elements in segment 700. According to one embodiment, feature transformer 654 may use the APACHE SPARK HashingTF Transformer function to generate the feature vectors illustrated. However, these feature vectors are simply provided by way of example and other feature vector generators known or developed in the art may be used to generate feature vectors from an EDI document.

According to one embodiment, feature transformer 654 maps raw features (e.g., tokenized terms from the translated EDI document) into a feature index by applying a hash function to each term, and the feature vector representing a data element comprises the indices to which the raw features of that data element were mapped. In FIG. 7B, for example, the feature vector PO101_1FTR that represents the data element PO101_1, includes the index "49" to which the term "1" is mapped by applying the hash function.

The hash function can be configured to map raw features into a target feature dimension of specified size. For example, the hash function may be configured with a target feature dimension of 200, meaning that the hash function maps each term into an index of 0-199 (the value "200" in the feature vector PO101_1FTR represents the target feature dimension used to generate the feature vector). Using too few features (having a feature dimension that is too small) may result in feature vectors that lead to poor classification accuracy if a model 662 is trained using those feature vectors. Similarly, using too many features (having a target feature dimension that is too large) may result in overtraining of the model 662. The feature dimension size that results in accurate training of a model may depend on the underlying data and thus, different values may be used in different implementations.

For completeness, the value "1.0" in the feature vector PO101_1FTR represents the term frequencies based on the mapped indices. In this example, since only the single term, "1", is mapped to the index "49" in the context of creating the PO101_FTR vector, the index term has a frequency of 1.0.

Feature transformer 654 combines the feature vectors created from the individual data elements of an EDI document to create a single feature vector mathematically representing that EDI document. FIG. 7C, for example, illustrates a resulting feature vector 720 from combining the feature vectors of FIG. 7B using the APACHE SPARK VectorAssembler utility class. However, feature vector 720 is simply provided by way of example and other feature vector assemblers known or developed in the art may be used to combine feature vectors.

In the example of FIG. 7A, FIG. 7B and FIG. 70, the feature vector 720 is created from data elements of a single segment 700. As will be appreciated, however, feature extractor 650 can transform elements from multiple segments (including all segments) from an EDI document to corresponding feature vectors based on mapping rules 656 and combine the feature vectors into a feature vector representing the EDI document. In some embodiments, every data element in an exemplar EDI document or EDI document for which a prediction is being made is mapped to a corresponding feature vector and the feature vectors are combined to create a feature vector representing the document.

FIG. 8 illustrates one embodiment of a dashboard 800 that may be provided to an OU user that alerts the user of predicted events, such as predicted late deliveries (indicated at 802). Dashboard 800 further illustrates that embodiments may be used to predict other events, such as payment of invoices (indicated at 804). Furthermore, the dashboard may display summaries of metrics (e.g., summaries of metric data generated by a metrics data generator).

FIG. 9 illustrates one embodiment of metrics data generation. At step 902, a metrics data generator connects to a data source and identifies historical EDI documents that have not been classified by the metrics data generator. The metrics data generator selects a document for processing (step 904) and determines if there is sufficient data to determine an actual classification for the document. For example, the metrics data generator may determine if the EDI analytics system has shipment data corresponding to a PO, payment data related to an invoice or other data used to classify an EDI document. If there is sufficient data, the metrics data generator can generate metrics data that classifies the EDI document and store the metrics data in the document record for the EDI document (step 906). The steps can be repeated for each document identified in step 902. The metrics data generator may apply the method of FIG. 9 according to a schedule (e.g., to process EDI documents in batch) or in real-time when the EDI management system receives sufficient data to generate metrics data for an EDI document (for example, receives an ASN or other shipment data corresponding to a PO, receives a remittance advice document or other payment data corresponding to an invoice).

FIG. 10 illustrates one embodiment for training a prediction model that can be performed by a prediction generator. At step 1002, the prediction generator connects to a data source and collects a training corpus of exemplar EDI documents. According to one embodiment, the training corpus comprises EDI documents that have a corresponding actual classification. The prediction generator selects an exemplar EDI document from the training corpus for processing (step 1004). The prediction generator determines the features of the exemplar EDI document (step 1006). According to one embodiment, for example, the prediction generator can tokenize the EDI document into individual terms based on a set of mapping rules. At step 1008, the prediction generator generates a feature vector for the exemplar EDI document from the determined features. As discussed above, this may include generating feature vectors for individual segments or data elements of the exemplar EDI document and combining the feature vectors to create a feature vector representing the exemplar EDI document. Steps 1002-1008 can be repeated for each exemplar EDI document in the training corpus.

At 1010, the prediction generator inputs the feature vectors representing the exemplar EDI documents and the corresponding actual classifications of the exemplar EDI documents into a model builder configured to generate a prediction model from the feature vectors and actual classifications. The prediction generator, at 1012, can store the resulting prediction model.

FIG. 11 illustrates one embodiment for applying a prediction model that can be performed by a prediction generator. At step 1102, the prediction generator can receive a new EDI document. The prediction generator determines the features of the new EDI document (step 1106). According to one embodiment, for example, the prediction generator can tokenize the EDI document into individual terms based on a set of mapping rules. At step 1108, the prediction generator generates a feature vector for the new EDI document from the determined features. As discussed above, this may include generating feature vectors for individual segments or data elements of the new EDI document and combining the feature vectors to create a feature vector representing the new EDI document. At step 1110, the prediction generator inputs the feature vector generated from the new EDI document into a prediction model configured to output a classification responsive to an input feature vector. The prediction generator can store the prediction generated by the prediction model in the document record of the new EDI document (step 1112). The prediction generator may apply the method of FIG. 11 according to a schedule (e.g., to process new EDI documents in batch) or in real-time when the EDI analytics system receives a new EDI document.

Figure 12:
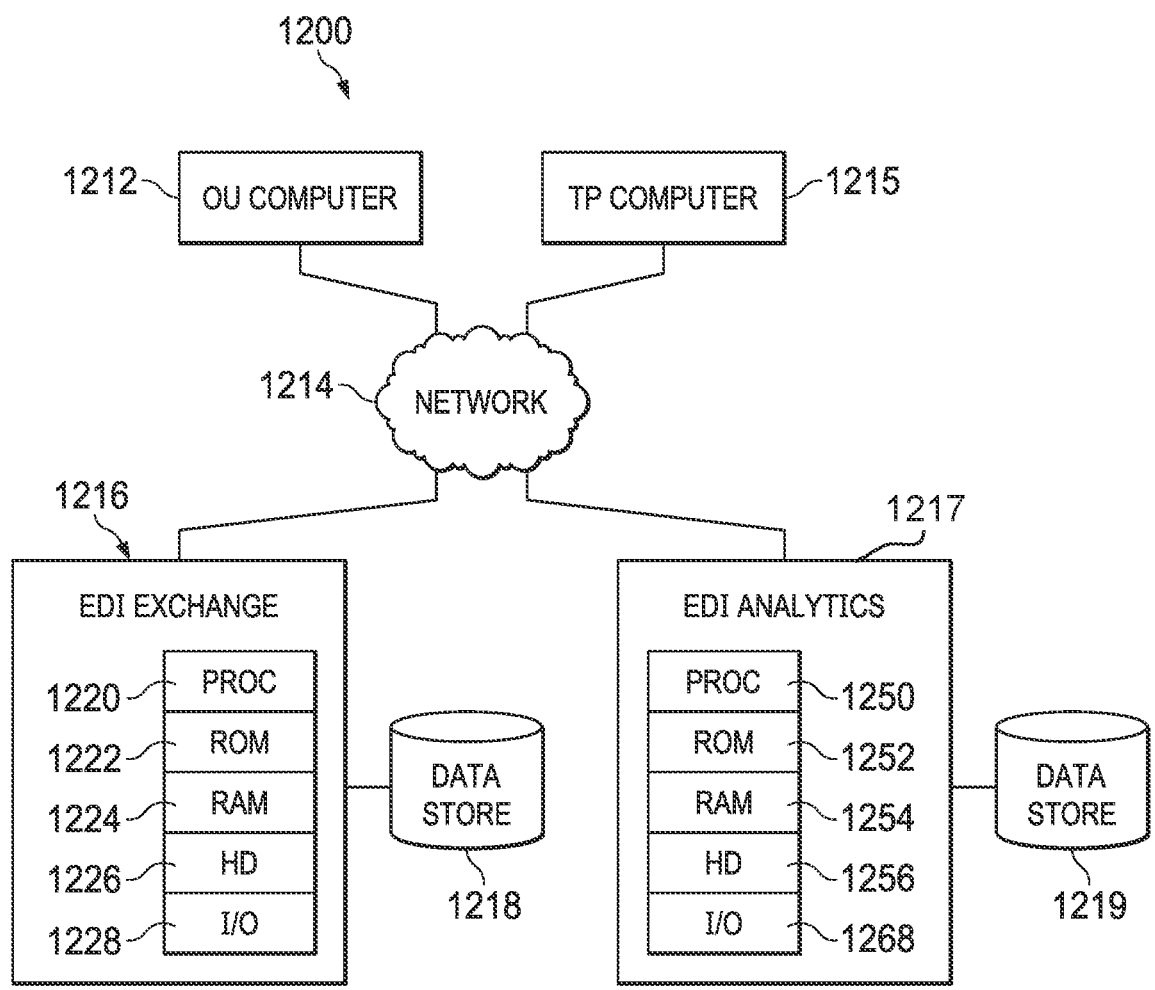
FIG. 12 is a diagrammatic representation of one embodiment of a distributed network computing environment where embodiments disclosed can be implemented.

FIG. 12 is a diagrammatic representation of a distributed network computing environment where embodiments disclosed can be implemented. In the example illustrated, network computing environment 1200 includes network 1214 that can be bi-directionally coupled to first enterprise computer 1212, second enterprise computer 1215, an EDI exchange system 1216, and an EDI analytics system 1217. EDI exchange system 1216 can be bi-directionally coupled to a data store 1218. EDI analytics system 1217 can be bi-directionally coupled to EDI exchange system 1216 and a data store 1219. Network 1214 may represent a combination of wired and wireless networks that network computing environment 1200 may utilize for various types of network communications known to those skilled in the art.

For the purpose of illustration, a single system is shown for each of first enterprise computer 1212, second enterprise computer 1215, EDI exchange system 1216 and EDI analytics system 1217. However, with each of first enterprise computer 1212, second enterprise computer 1215, EDI exchange system 1216 and EDI analytics system 1217 may comprise a plurality of computers (not shown) interconnected to each other over network 1214. For example, a plurality of first enterprise computers 1212 and a plurality of second enterprise computers 1215 may be coupled to network 1214. First enterprise computer 1212 and second enterprise computer may include data processing systems for communicating EDI documents via EDI exchange system 1216. EDI exchange system 1216 comprises a networked EDI system configured to receive electronic data interchange documents over a network from first enterprise computers 1212 and second enterprise computers 1215, capture electronic data interchange document data and deliver the electronic data interchange documents over the network.

EDI exchange system 1216, which is one example embodiment of an EDI exchange system 110, can include a processor 1220, read-only memory ("ROM") 1222, random access memory ("RAM") 1224, hard drive ("HD") or storage memory 1226, and input/output device(s) ("I/O") 1228. EDI exchange system 1216 may include one or more backend systems configured for providing a variety of services to first enterprise computers 1212 and second enterprise computer 716 over network 1214. EDI exchange system 1216 may utilize data stored in a data store 1218. Many other alternative configurations are possible and known to skilled artisans.

EDI analytics system 1217, which is one example embodiment of an EDI analytics system 150, 200, can include a processor 1250, read-only memory ("ROM") 1252, random access memory ("RAM") 1254, hard drive ("HD") or storage memory 1256, and input/output device(s) ("I/O") 1258 EDI exchange system 1216 may utilize data stored in data store 1218 or a data store 1219. One or more of the memories, data store 1218 or data store 1219 can provide a memory for storing EDI data and a prediction model representing element information of electronic data interchange documents. For example, EDI analytics system 1217 may store a prediction model representing element information extracted from POs and corresponding delivery statuses. The processor 1250 can be configured (e.g., via computer executable instructions embodied on a non-transitory medium) to perform the functions described herein.

Each of first enterprise computer 1212, second enterprise computer 1215, EDI exchange system 1216 and EDI analytics system 1217 in FIG. 7 may have more than one processor, ROM, RAM, HD, I/O, or other hardware components. For the sake of brevity, EDI exchange system 1216 and EDI analytics system 1217 are illustrated as having one of each of the hardware components, even if more than one is used. Each of computers 1212, 1215, EDI exchange system 1216 and EDI analytics system 1217 is an example of a data processing system. ROM 1222 and 1252; RAM 1224 and 1254; HD 1226 and 1256; data store 1218 and data store 1219 can include media that can be read by processor 1220 or 1250.

Portions of the methods described herein may be implemented in suitable software code that may reside within ROM 1222 or 1252; RAM 1224 or 1254; or HD 1226 or 1256. In addition to those types of memories, the instructions in an embodiment disclosed herein may be contained on a data storage device with a different computer-readable storage medium. The instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by a CPU or other processor or capable of being compiled or interpreted to be executable by the CPU or other processor. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain or store a program for use by or in connection with the instruction execution system, apparatus, system or device. The computer readable medium can be, by way of example only but not by limitation, an electronic, magnetic, optical, electromagnetic, or semiconductor system, apparatus, system, device or computer memory. Such computer-readable medium shall generally be machine readable and include software programming or code. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the foregoing specification, the invention has been described with reference to specific embodiments. However, one of ordinary skill in the art appreciates that various modifications and changes can be made without departing from the scope of the invention. Accordingly, the specification, including the Summary and Abstract, and figures are to be regarded in an illustrative rather than a restrictive sense, and all such modifications are intended to be included within the scope of invention.

What is claimed is:

1. A system for electronic data interchange (EDI) management comprising:
a networked EDI system configured to receive EDI documents over a network, capture EDI document data and deliver the EDI documents over the network;
a memory configured to store data comprising:
EDI document data;
a machine learning model representing element information of a corpus of training EDI documents of a first type and metrics data that classifies the training EDI documents of the first type, the machine learning model trained to classify documents according to a plurality of classes;
a processor that is configured to perform a method comprising:
for an EDI document of the first type:
extracting elements from the EDI document of the first type and creating a document record for the EDI document of the first type, the document record comprising the elements extracted from the EDI document of the first type;
predicting a class from the plurality of classes for the EDI document of the first type by processing the extracted elements using the machine learning model; and
adding a label for the predicted class to the document record for the EDI document of the first type, the label accessible to a client computer via a presentation layer.

2. The system for EDI management of claim 1, wherein the elements extracted from the EDI document of the first type include a time parameter comprising a time parameter value, wherein the plurality of classes comprise event status classes for an event related to the EDI document of the first type, and wherein predicting the class for the EDI document of the first type comprises predicting the event status class for the event related to the EDI document of the first type relative to the time parameter value.

3. The system of claim 1, wherein the processor is further configured to perform:
receiving an EDI document of a second type;
associating the EDI document of the first type with the EDI document of the second type;
determining an actual class, from the plurality of classes, for the EDI document of the second type; and
adding a label for the actual class to the document record for the EDI document of the first type.

4. The system for EDI management of claim 3, wherein:
the elements extracted from the EDI document of the first type include a time parameter comprising a time parameter value,
the plurality of classes comprises event status classes for an event related to the EDI document of the first type,
predicting the class for the EDI document of the first type comprises predicting an event status class for the event related to the EDI document of the first type relative to the time parameter value, and
determining the actual class, from the plurality of classes, for the EDI document of the first type based on the EDI document of the second type comprises determining an actual event status class from the event status classes.

5. The system of EDI management of claim 4, wherein:
the event status classes comprise a late event class; and
predicting the event status class for the event related to the EDI document of the first type relative to the time parameter value comprises predicting the late event class for the event.

6. The system of EDI management of claim 5, wherein determining the actual class, from the plurality of classes, for the EDI document of the first type based on the EDI document of the second type comprises determining from the EDI document of the second type that the event occurred late relative to the time parameter value from the EDI document of the first type.

7. A computer program product comprising a non-transitory, computer-readable medium storing a set of computer instructions executable by a computer, the set of computer instructions comprising instructions for:
accessing electronic data interchange (EDI) document data;
accessing a machine learning model representing element information of a corpus of training EDI documents of a first type and metrics data that classifies the training EDI documents of the first type, the machine learning model trained to classify documents according to a plurality of classes;
receiving an EDI document of the first type;
extracting elements from the EDI document of the first type;
creating a document record for the EDI document of the first type, the document record comprising the extracted elements from the EDI document of the first type;
predicting a class, from the plurality of classes, for the EDI document of the first type, wherein predicting the class comprises processing the extracted elements using the machine learning model;
adding a label for the predicted class to the document record for the EDI document of the first type; and
providing the label for the predicted class for the EDI document of the first type for presentation via a presentation layer.

8. The computer program product of claim 7, wherein the elements extracted from the EDI document of the first type include a time parameter comprising a time parameter value, wherein the plurality of classes comprise event status classes for an event related to the EDI document of the first type, and wherein the instructions for predicting the class for the EDI document of the first type by processing the extracted elements using the machine learning model comprise instructions for predicting an event status class for the event related to the EDI document of the first type relative to the time parameter value.

9. The computer program product of claim 8, wherein the event status classes comprise a late event class, and wherein the instructions for predicting the event status class for the event related to the EDI document of the first type relative to the time parameter value comprise instructions for predicting the late event class for the event.

10. The computer program product of claim 9, wherein the event status classes comprise an on time event class, and wherein the instructions for predicting the event status class for the event related to the EDI document of the first type relative to the time parameter value comprise instructions for predicting the on time event class for the event.

11. The computer program product of claim 7, wherein the set of computer instructions comprises instructions for:
receiving an EDI document of a second type;
associating the EDI document of the first type with the EDI document of the second type;
determining an actual class, from the plurality of classes, for the EDI document of the first type based on the EDI document of the second type; and
adding a label for the actual class to the document record for the EDI document of the first type.

12. The computer program product of claim 11, wherein the elements extracted from the EDI document of the first type include a time parameter comprising a time parameter value, wherein the plurality of classes comprise event status classes for an event related to the EDI document of the first type, wherein the instructions for predicting the class for the EDI document of the first type by processing the extracted elements using the machine learning model comprise instructions for predicting an event status class for the event related to the EDI document of the first type relative to the time parameter value, and wherein the instructions for determining the actual class, from the plurality of classes, for the EDI document of the first type based on the EDI document of the second type comprise instructions for determining a timing of the event from the EDI document of the second type.

13. The computer program product of claim 12, wherein the event status classes comprise a late event class, wherein the instructions for predicting the event status class for the event related to the EDI document of the first type relative to the time parameter value comprise instructions for predicting the late event class for the event, and wherein the instructions for determining the timing of the event comprise instructions for determining that the event is late relative to the time parameter value.

14. The computer program product of claim 13, wherein the event status classes comprise an on time event class, wherein the instructions for predicting the event status class for the event related to the EDI document of the first type relative to the time parameter value comprise instructions for predicting the on time event class for the event, and wherein instructions for determining a timing of the event comprise instructions for determining that the event is on time relative to the time parameter value.

15. The computer program product of claim 14, wherein the time parameter value is a date.

16. A method for electronic data interchange (EDI) management, comprising:
receiving an EDI document of a first type;
extracting elements from the EDI document of the first type;
creating a document record for the EDI document of the first type, the document record comprising the extracted elements from the EDI document of the first type;
predicting, from a plurality of classes, a class for the EDI document of the first type, wherein predicting the class comprises applying a machine learning model to the extracted elements, the machine learning model trained to classify documents according to the plurality of classes and representing training data comprising:
element information of a corpus of training EDI documents of the first type; and
metrics data that classifies the training EDI documents of the first type; and
adding a label for the predicted class to the document record for the EDI document of the first type, the label accessible to a client computer via a presentation layer.

17. The method for EDI management of claim 16, wherein the elements extracted from the EDI document of the first type include a time parameter comprising a time parameter value, wherein the plurality of classes comprise event status classes for an event related to the EDI document of the first type, and wherein predicting the class for the EDI document of the first type comprises predicting an event status class for the event related to the EDI document of the first type relative to the time parameter value.

18. The method for EDI management of claim 17, wherein the event status classes comprise a late event class, and wherein predicting the event status class for the event related to the EDI document of the first type relative to the time parameter value comprise instructions for predicting the late event class for the event.

19. The method for EDI management of claim 17, wherein the event status classes comprise an on time event class, and wherein predicting the event status class for the event related to the EDI document of the first type relative to the time parameter value comprise instructions for predicting the on time event class for the event.

20. The method for EDI management of claim 16, further comprising:
receiving an EDI document of a second type;
associating the EDI document of the first type with the EDI document of the second type;
determining an actual class, from the plurality of classes, for the EDI document of the first type based on the EDI document of the second type; and
adding a label for the actual class to the document record for the EDI document of the first type.

21. The method for EDI management of claim 20, wherein the elements extracted from the EDI document of the first type include a time parameter comprising a time parameter value, wherein the plurality of classes comprise event status classes for an event related to the EDI document of the first type, wherein predicting the class for the EDI document of the first type comprises predicting the event status class for the event related to the EDI document of the first type relative to the time parameter value, and wherein determining the actual class, from the plurality of classes, for the EDI document of the first type based on the EDI document of the second type comprises determining a timing of the event from the EDI document of the second type.

22. The method of EDI management of claim 21, wherein the event status classes comprise a late event class, and wherein predicting the event status class for the event related to the EDI document of the first type relative to the time parameter value comprises predicting the late event class for the event.

23. The method of EDI management of claim 21, wherein the event status classes comprise an on time event class and wherein predicting the event status class for the event related to the EDI document of the first type relative to the time parameter value comprises predicting the on time event class for the event.

* * * * *